US008644560B2

(12) United States Patent
Myokan

(10) Patent No.: US 8,644,560 B2
(45) Date of Patent: Feb. 4, 2014

(54) IMAGE PROCESSING APPARATUS AND METHOD, AND PROGRAM

(75) Inventor: Yoshihiro Myokan, Kanagawa (JP)

(73) Assignee: Sony Corporation, Tokyo (JP)

( * ) Notice: Subject to any disclaimer, the term of this patent is extended or adjusted under 35 U.S.C. 154(b) by 199 days.

(21) Appl. No.: 13/285,432

(22) Filed: Oct. 31, 2011

(65) Prior Publication Data

US 2012/0134536 A1    May 31, 2012

(30) Foreign Application Priority Data

Nov. 26, 2010 (JP) ................ P2010-263805

(51) Int. Cl.
*G06K 9/00* (2006.01)
*G06T 15/00* (2011.01)

(52) U.S. Cl.
USPC ............................ 382/106; 382/291; 345/419

(58) Field of Classification Search
USPC ......... 382/100, 103, 106–107, 154, 162, 168, 382/171–173, 181, 232, 254, 274, 276, 285, 382/291, 305, 312; 345/156, 419; 235/470
See application file for complete search history.

(56) References Cited

U.S. PATENT DOCUMENTS

| 7,764,828 | B2* | 7/2010 | Sasaki et al. .................. 382/154 |
| 7,898,522 | B2* | 3/2011 | Hildreth et al. ............... 345/156 |
| 8,422,824 | B2* | 4/2013 | Chen et al. .................... 382/285 |
| 2008/0030460 | A1* | 2/2008 | Hildreth et al. ............... 345/156 |
| 2010/0200660 | A1* | 8/2010 | Moed et al. ................... 235/470 |

* cited by examiner

*Primary Examiner* — Seyed Azarian
(74) *Attorney, Agent, or Firm* — Sherr & Jiang, PLLC

(57) ABSTRACT

An image processing apparatus includes a depth image obtaining unit configured to obtain a depth image including information on distances from an image-capturing position to a subject in a two-dimensional image to be captured; a local tip portion detection unit configured to detect a portion of the subject at a depth and a position close from the image-capturing position as a local tip portion; a projecting portion detection unit configured to detect, in a case where, when each of the blocks is set as a block of interest, the local tip portion of the block of interest in an area formed of the plurality of blocks adjacent to the block of interest, becomes a local tip portion closest from the image-capturing position, the local tip portion as a projecting portion; and a tracking unit configured to continuously track the position of the projecting portion.

15 Claims, 18 Drawing Sheets

| |
|---|
| TRACKING ID |
| MOST RECENT FRAME COORDINATE (x, y) |
| LIKELIHOOD p (0 ≤ p ≤ 1.0) |
| UPDATE FLAG f (0: NO UPDATE, 1: UPDATED) |

H1  r101  r102  H2

| TRACKING ID |
|---|
| PRIORITY q |

# IMAGE PROCESSING APPARATUS AND METHOD, AND PROGRAM

BACKGROUND

The present disclosure relates to an image processing apparatus and method, and a program. More particularly, the present disclosure relates to an image processing apparatus and method, and a program that are capable of easily recognizing a gesture made by an image-captured person.

Examples of image processing apparatuses include a gesture recognition apparatus that recognizes gestures made by a person by performing image processing.

For example, a technology has been proposed in which a frame image is divided into a plurality of image blocks, a change between frames is calculated for each image block, and a gesture is identified (see Japanese Unexamined Patent Application Publication No. 2009-064199).

Furthermore, a technology has been proposed in which after a depth image is obtained by using time-of-flight and the depth distribution (histogram) of the entirety is calculated, a threshold value in the depth direction is determined, hand and arm portions, which are regions of interest (ROI), are labeled and cut out, and then the center point of the cutout is obtained and is set as the coordinates of the gesture (see YANG-Keun Ahn, Young-Choong Park, Kwang-Soon Choi, Woo-Chool-Park, Hae-Moon Seo, Kwang-Mo Jung, "3D Spatial Touch System Based on Time-of-flight Camera", WSEAS TRANSACTIONS on INFORMATION SCIENCE and APPLICATIONS, Issue 9, Volume 6, September 2009).

SUMMARY

However, in the method of Japanese Unexamined Patent Application Publication No. 2009-064199, if there is rapid motion in the background of a recognition object, there is a risk that normal recognition is difficult to be performed.

Furthermore, in the technology of YANG-Keun Ahn, Young-Choong Park, Kwang-Soon Choi, Woo-ChoolPark, Hae-Moon Seo, Kwang-Mo Jung, "3D Spatial Touch System Based on Time-of-flight Camera", WSEAS TRANSACTIONS on INFORMATION SCIENCE and APPLICATIONS, Issue 9, Volume 6, September 2009, a labeling process for determining a region of interest is necessary, and the cost in terms of processing time is large. Furthermore, in the technology of YANG-Keun Ahn, Young-Choong Park, Kwang-Soon Choi, Woo-ChoolPark, Hae-Moon Seo, Kwang-Mo Jung, "3D Spatial Touch System Based on Time-of-flight Camera", WSEAS TRANSACTIONS on INFORMATION SCIENCE and APPLICATIONS, Issue 9, Volume 6, September 2009, when performing labeling, it is necessary to provide a threshold value, presenting the problem of poor versatility.

In particular, under the assumption that a depth image including information on distances from an image-capturing position to a subject in an image in units of pixels can be obtained, it is desirable that a local tip portion is obtained from the depth image, a trajectory that is continuous in units of frames is obtained within the local tip portion, and a gesture is recognized on the basis of the trajectory, making it possible to accurately recognize a gesture while reducing the processing load.

According to an embodiment of the present disclosure, there is provided an image processing apparatus including a depth image obtaining unit configured to obtain a depth image including information on distances from an image-capturing position to a subject in a two-dimensional image to be captured, the depth image being in units of pixels of the image; a local tip portion detection unit configured to detect a portion of the subject at a depth and a position close from the image-capturing position as a local tip portion in units of blocks formed every plurality of adjacent pixels in the depth image; a projecting portion detection unit configured to detect, in a case where, when each of the blocks is set as a block of interest, the local tip portion of the block of interest in an area formed of the plurality of blocks adjacent to the block of interest, including the block of interest, becomes a local tip portion closest from the image-capturing position in the region, the local tip portion as a projecting portion; and a tracking unit configured to continuously track the position of the projecting portion detected by the projecting portion detection unit.

The image processing apparatus may further include a gesture detection unit configured to recognize a trajectory of the position of the projecting portion tracked by the tracking unit as an action of the subject to be image-captured in the image, and detect a gesture made by the action of the subject on the basis of the trajectory.

The tracking unit may start tracking of the position of the projecting portion that is detected by the projecting portion detection unit, thereafter may track, when the projecting portion is continuously detected in the time direction within a predetermined range in the vicinity of the position of the projecting portion detected immediately before, the position of the projecting portion that is continuously detected in the time direction within the predetermined range in the vicinity of the position of the projecting portion detected immediately before, and may track, when the projecting portion is not continuously detected in the time direction within the predetermined range in the vicinity of the position of the projecting portion detected immediately before, the position of the local tip portion that is continuously detected in the time direction in the predetermined range in the vicinity of the position of the projecting portion detected immediately before as the position of the projecting portion.

The tracking unit may track either the position of the projecting portion tracked by the tracking unit or the position of the local tip portion as the position of the tip portion, may set a likelihood in each of the tip portions, and may end the tracking of the tip portion in which the likelihood has become smaller than a predetermined threshold value.

The image processing apparatus may further include a tracking priority setting unit configured to set a tracking priority of the tip portion in accordance with a gesture detected by the gesture detection unit on the basis of the trajectory of the tip portion, wherein the tracking unit may set the respective likelihoods on the basis of the corresponding tracking priorities of the respective tip portions.

According to another embodiment of the present disclosure, there is provided an image processing method for use with an image processing apparatus including a depth image obtaining unit configured to obtain a depth image including information on distances from an image-capturing position to a subject in a two-dimensional image to be captured, the depth image being in units of pixels of the image, a local tip portion detection unit configured to detect a portion of the subject at a depth and a position close from the image-capturing position as a local tip portion in units of blocks formed every plurality of adjacent pixels in the depth image, a projecting portion detection unit configured to detect, in a case where, when each of the blocks is set as a block of interest, the local tip portion of the block of interest in an area formed of the plurality of blocks adjacent to the block of interest, including the block of interest, becomes a local tip portion closest from the image-capturing position in the region, the local tip portion as a projecting portion, and a tracking unit configured to continuously track the position of the projecting portion detected by the projecting portion detection unit, the image processing method including: obtaining, in the depth image obtaining unit, a depth image including information on distances from an image-capturing position to a subject in a two-dimensional image to be captured, the depth image being in units of pixels of the image; detecting, in the local tip portion detection unit, a portion of the subject at a depth and a position close from the image-capturing position as a local tip portion in units of blocks formed every plurality of adjacent pixels in the depth image; detecting, in the projecting portion detection unit, in a case where, when each of the blocks is set as a block of interest, the local tip portion of the block of interest in an area formed from the plurality of blocks adjacent to the block of interest, including the block of interest, becomes a local tip portion closest from the image-capturing position in the area, the local tip portion as a projecting portion; and continuously tracking, in the projecting portion detection unit, the position of the projecting portion detected in the projecting portion detection.

According to another embodiment of the present disclosure, there is provided a program that causes a computer that controls an image processing apparatus including a depth image obtaining unit configured to obtain a depth image including information on distances from an image-capturing position to a subject in a two-dimensional image to be captured, the depth image being in units of pixels of the image, a local tip portion detection unit configured to detect a portion of the subject at a depth and a position close from the image-capturing position as a local tip portion in units of blocks formed every plurality of adjacent pixels in the depth image, a projecting portion detection unit configured to detect, in a case where, when each of the blocks is set as a block of interest, the local tip portion of the block of interest in an area formed of the plurality of blocks adjacent to the block of interest, including the block of interest, becomes a local tip portion closest from the image-capturing position in the region, the local tip portion as a projecting portion, and a tracking unit configured to continuously track the position of the projecting portion detected by the projecting portion detection unit, to perform processing including: obtaining, in the depth image obtaining unit, a depth image including information on distances from an image-capturing position to a subject in a two-dimensional image to be captured, the depth image being in units of pixels of the image; detecting, in the local tip portion detection unit, a portion of the subject at a depth and a position close from the image-capturing position as a local tip portion in units of blocks formed every plurality of adjacent pixels in the depth image; detecting, in the projecting portion detection unit, in a case where, when each of the blocks is set as a block of interest, the local tip portion of the block of interest in an area formed from the plurality of blocks adjacent to the block of interest, including the block of interest, becomes a local tip portion closest from the image-capturing position in the area, the local tip portion as a projecting portion; and continuously tracking, in the projecting portion detection unit, the position of the projecting portion detected in the projecting portion detection.

In an embodiment of the present disclosure, a depth image including information on distances from an image-capturing position to a subject in a two-dimensional image to be captured, the depth image being in units of pixels of the image, is obtained. A portion at a depth and a position close from the image-capturing position is detected as a local tip portion in units of blocks formed every plurality of adjacent pixels in the depth image. In a case where, when each of the blocks is set as a block of interest, the local tip portion of the block of interest in an area formed from the plurality of blocks adjacent to the block of interest, including the block of interest, becomes a local tip portion closest from the image-capturing position in the area, the local tip portion is detected as a projecting portion, and the position of the projecting portion detected is continuously tracked.

The image processing apparatus according to an embodiment of the present disclosure may be an independent apparatus, and may also be a block that performs image processing.

According to an embodiment of the present disclosure, it becomes possible to easily recognize a gesture made by a person in an image captured using the trajectory of the position of a local tip portion, which is detected continuously with respect to time, on the basis of a depth image formed including values corresponding to distances from the image-capturing position, the depth image being in units of pixels of a subject in the image.

DETAILED DESCRIPTION OF EMBODIMENTS

Example of Configuration of Image Processing Apparatus

Figure 1:
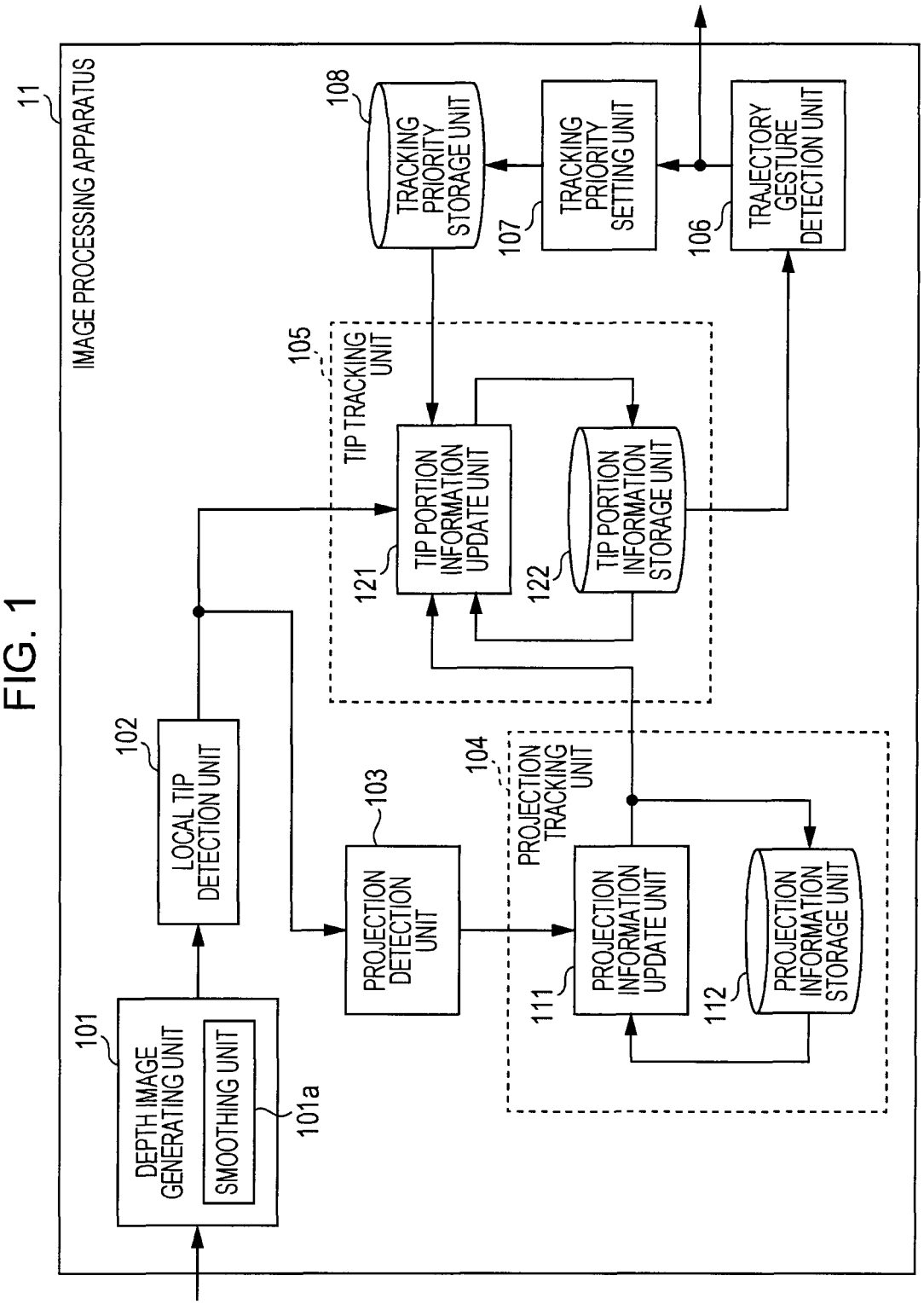
FIG. 1 is a block diagram illustrating an example of the configuration of an embodiment of an image processing apparatus to which the present disclosure is applied.

FIG. 1 illustrates an example of the configuration of an embodiment of hardware of an image processing apparatus to which the present disclosure is applied. When an image processing apparatus 11 of FIG. 1 receives the supply of a captured image, the image processing apparatus 11 detects a gesture made by a person contained as a subject in an image, and outputs the information on the detected gesture.

More specifically, the image processing apparatus 11 includes a depth image generation unit 101, a local tip portion detection unit 102, a projecting portion detection unit 103, a projecting portion tracking unit 104, a tip tracking unit 105, a gesture trajectory detection unit 106, a tracking priority setting unit 107, and a tracking priority storage unit 108.

The depth image generation unit 101 generates a depth image formed including values corresponding to distances from the image-capturing position to a subject in pixel units in a captured image that is input, and supplies the depth image to the local tip portion detection unit 102.

Furthermore, the depth image generation unit 101 includes a smoothing unit 101a, and smoothes the generated depth image. That is, the depth image contains a lot of noise originating from an image sensor, which is contained in the captured image, and many uncorrelated errors between left and right, such as a difference in a reflection state due to a viewpoint difference, and the depth image is smoothed to statistically decrease this influence.

The local tip portion detection unit 102 divides the depth image supplied from the depth image generation unit 101 into units of blocks, such as 16 pixels×16 pixels, and detects, in units of blocks, area information (coordinates) of a portion close to the image-capturing position, that is, area information (coordinates) of a portion that is on the near side (that is, the side close to the user) as a local tip portion. Then, the local tip portion detection unit 102 supplies the information of the local tip portion, which is the detection result, to the projecting portion detection unit 103 and the tip tracking unit 105. In the following, a description will be given by assuming that the depth image is an image in which depth values are stored in units of pixels such that the closer to the near side (the image-capturing position side) the depth image becomes, the larger the depth value becomes, and conversely, the further from the image-capturing position, the smaller the depth value (the disparity value) becomes. However, it is sufficient that the depth value corresponds to the distance from the image-capturing position to the subject. A so-called distance value may be used such that the smaller the distance from the image-capturing position the smaller the distance value becomes, and the larger the distance the larger the distance value becomes.

When the projecting portion detection unit 103 controls the projection information update unit 111 and sets, for example, each block as a block of interest on the basis of the information of the local tip portion for each block area, which is output by the local tip portion detection unit 102, the projecting portion detection unit 103 detects the local tip portion of the block of interest as a projecting portion when the value of the local tip portion of the block of interest becomes a maximum value in the area from among the values of the local tip portion of each block of the area of 3 blocks×3 blocks in which the block of interest, and 8 surrounding blocks that are adjacent to the block of interest (up, down, to the right, to the left, and oblique) are combined, and supplies the information as projection information to the projecting portion tracking unit 104. The area that is set with respect to the block of interest is not limited to the above-mentioned 9 blocks, and may also be an area that is set to blocks of a number other than that.

The projecting portion tracking unit 104 includes a projection information update unit 111 and a projection information storage unit 112. When the projection information containing the position of the projecting portion detected by the projecting portion detection unit 103 is within a predetermined range in the vicinity of the position of the projecting portion of the previous frame, the projection information update unit 111 of the projecting portion tracking unit 104 assumes that the same projecting portion has been continuously detected, tracks the projecting portion by counting the number of continuously detected times, causes the projection information storage unit 112 to store the tracking result as projection information, and updates the projection information.

The tip tracking unit 105 controls the tip portion information update unit 121, and assumes, as a tip portion using a gesture trajectory of a person contained as a subject in the image, the position of the pixel in which the disparity detected by the projecting portion tracking unit 104 as a projecting portion continuously for a fixed number of frames or more (for example, 8 frames or more) becomes a local maximum, that is, the position of the local tip portion. Then, the tip tracking unit 105 tracks the position of the tip portion, sets the information on the position of the tip portion, which is sequentially updated, as tip portion information, and causes the tip portion information storage unit 122 to store the information. At this time, after the tracking of the projecting portion is started, when, on the basis of the projection information output by the projecting portion tracking unit 104, a projecting portion is detected in a predetermined range in the vicinity of the position of the projecting portion, which is detected in the immediately previous frame, the tip portion update unit 121 assumes that the same projecting portion has been continuously detected. Then, the tip portion information update unit 121 tracks the position of the projecting portion as the position of the tip portion forming a gesture in accordance with the action of the subject, and causes the tip portion information storage unit 122 to store the tracking result as tip portion information.

Furthermore, after the tracking of the projecting portion is started, when a projecting portion is not detected in a predetermined range in the vicinity of the position of the projecting portion detected in the immediately previous frame on the basis of the projection information output by the projecting portion tracking unit 104, the tip tracking unit 105 tracks the local tip portion that exists in the predetermined range in the vicinity of the position of the projecting portion detected in the immediately previous frame as the position of the tip portion that is continuously detected on the basis of the information of the local tip portion for each block detected by the local tip portion detection unit 102, and sequentially updates the tip portion information stored in the tip portion information storage unit 122. Furthermore, the tip portion information update unit 121 sets the likelihood together with the position of the tip portion as the tip portion information, causes the likelihood of the corresponding tip portion information to be attenuated when the tracking of the projecting portion is difficult to be performed and the likelihood becomes smaller than a predetermined threshold value, and deletes the corresponding tip portion information from the tip portion information storage unit 122 when the position of the tip portion is updated by using the local tip portion. In addition, the tip portion information update unit 121 calculates the likelihood of the tip portion information corresponding to the tracking ID on the basis of the information on the tracking priority that is set in such a manner as to correspond to the tracking ID that is set for each tip portion information stored in the tracking priority storage unit 108.

The gesture trajectory detection unit 106 detects a gesture by using the position information (coordinates information) of the tip portion information, which is stored in the tip portion information storage unit 122 of the tip tracking unit 105, as a trajectory of the tip portion, such as the fingers or the fingertip, which forms a gesture corresponding to the action performed by the subject when a gesture is made, and outputs the information of the gesture, which is the detection result. Furthermore, the gesture trajectory detection unit 106 also supplies the information of the gesture, which is the detection result, to the tracking priority setting unit 107. The gesture trajectory detection unit 106 analyzes the amount of change in the trajectory with respect to time by using, for example, a hidden Markov model (HMM) as an example of a gesture recognition technique using the trajectory of the tip portion contained in the position information (coordinates information) contained in the tip portion information, and thus recognizes the gesture. Regarding the details of the gesture recognition technique, reference should be made to An HMM-Based Threshold Model Approach for Gesture Recognition, Hyeon-Kyu Lee and Jin H. Kim.

The tracking priority setting unit 107 forms a trajectory on the basis of the gesture detection result by the gesture trajectory detection unit 131, sets the priority in such a manner as to correspond to the tracking ID that is used to identify the tip portion information for the tracking object, and causes the tracking priority storage unit 108 to store the priority in frame units. When, for example, a trajectory that draws a closed path of a circular shape is detected, the tracking priority setting unit 107 sets the priority to be high.

Image Processing

Next, a description will be given, with reference to the flowchart of FIG. 2, of image processing performed by the image processing apparatus 11 of FIG. 1.

In step S11, the depth image generation unit 101 generates a depth image formed including values corresponding to distances from the image-capturing position to the subject in units of pixels in the captured image that is input. In more detail, the depth image generation unit 101 searches for, for example, a correspondence point between a plurality of images that are captured by using two or more cameras that are provided at different positions by using an algorithm, such as stereo matching, obtains a parallax at positions of a pixel in a reference image and a pixel in a reference image with respect to one another, obtains, on the basis of the principle of triangulation in accordance with the distance from the image-capturing position to the subject in units of pixels, a value (disparity) such that, for example, the closer to the image-capturing position, the larger the value becomes, and the further from the image-capturing position, the smaller the value becomes, and generates a depth image formed including pixel values corresponding to distances obtained in units of pixels. Furthermore, regarding the captured image, it is sufficient that a depth image is obtained, and thus, the depth image generation unit 101 may generate the depth image by a method other than this. For example, by measuring, in units of pixels, the time from when range-finding light, such as a near-infrared ray, which is emitted to the subject from the image-capturing position to the subject, which is called time of flight (TOF), until the range-finding light returns, the depth image generation unit 101 may obtain the distance from the image-capturing position to the subject in units of pixels, and may generate a depth image by using this distance.

Figure 3:
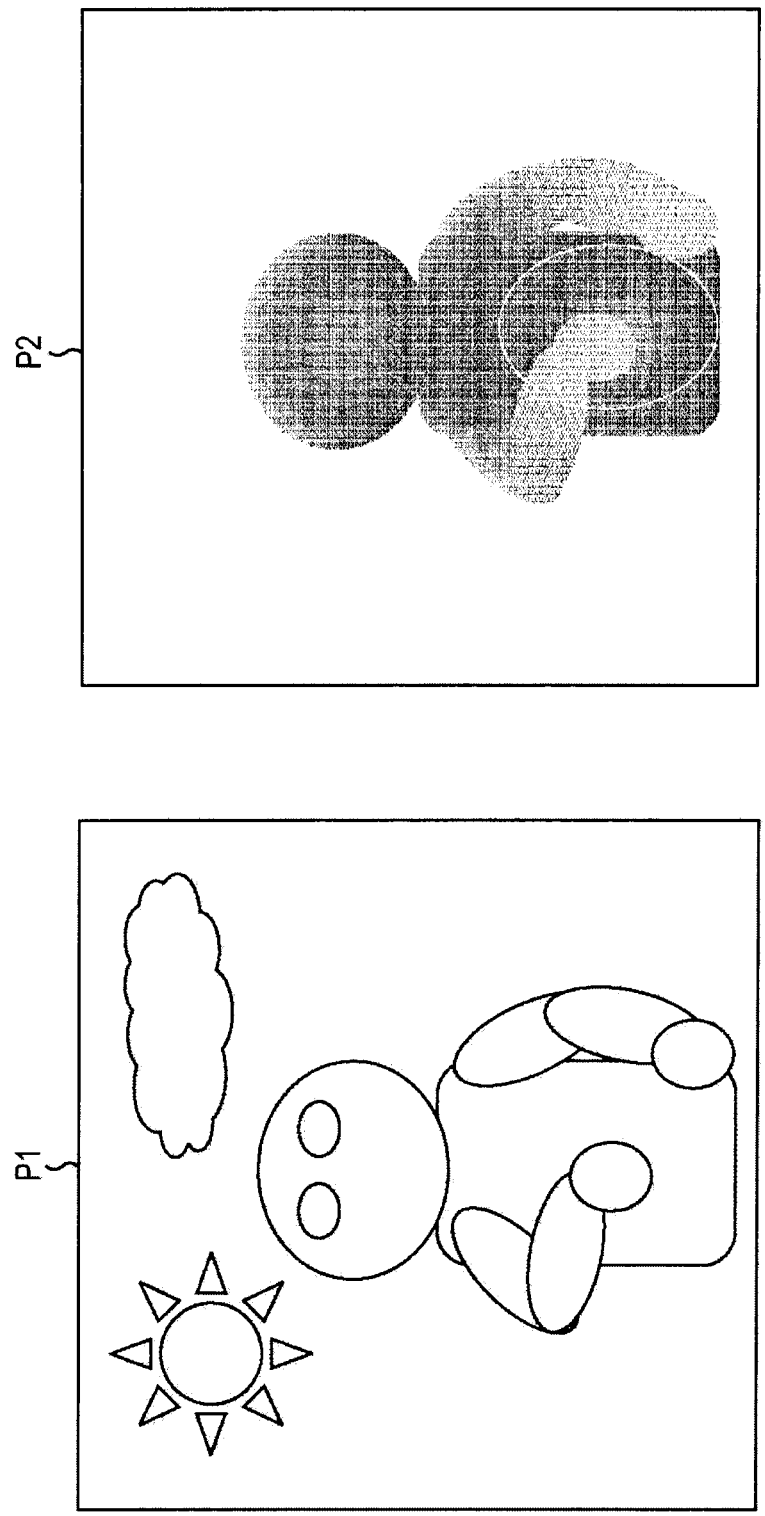
FIG. 3 illustrates an input image and a depth image.

As a result, as shown by an image P1 of FIG. 3, when, for example, an input image in which the sun exists in the left upper area, a cloud exists in the right upper portion, and a person exists in the central low area is input, as shown by an image P2 of FIG. 3, an image will be obtained in which the vicinity of the fingers of the person who is located in the near side when viewed from the image-capturing position has the highest pixel value, and the area serving as the background has a low pixel value.

In step S12, the smoothing unit 101a smoothes pixel values formed from disparity by replacing the pixel values with a moving average value of the values of pixels, for example, in a range of 8 pixels×8 pixels by using each pixel of the depth image as a reference in accordance with, for example, an arithmetic operation indicated by equation (1) below. Then, the depth image generation unit 101 supplies the smoothed depth image to the local tip portion detection unit 102.

$$g(x, y) = \frac{\sum_{0 \le j < 8} \sum_{0 \le i < 8} f(x+i, y+j)}{64} \quad (1)$$

Figure 4:
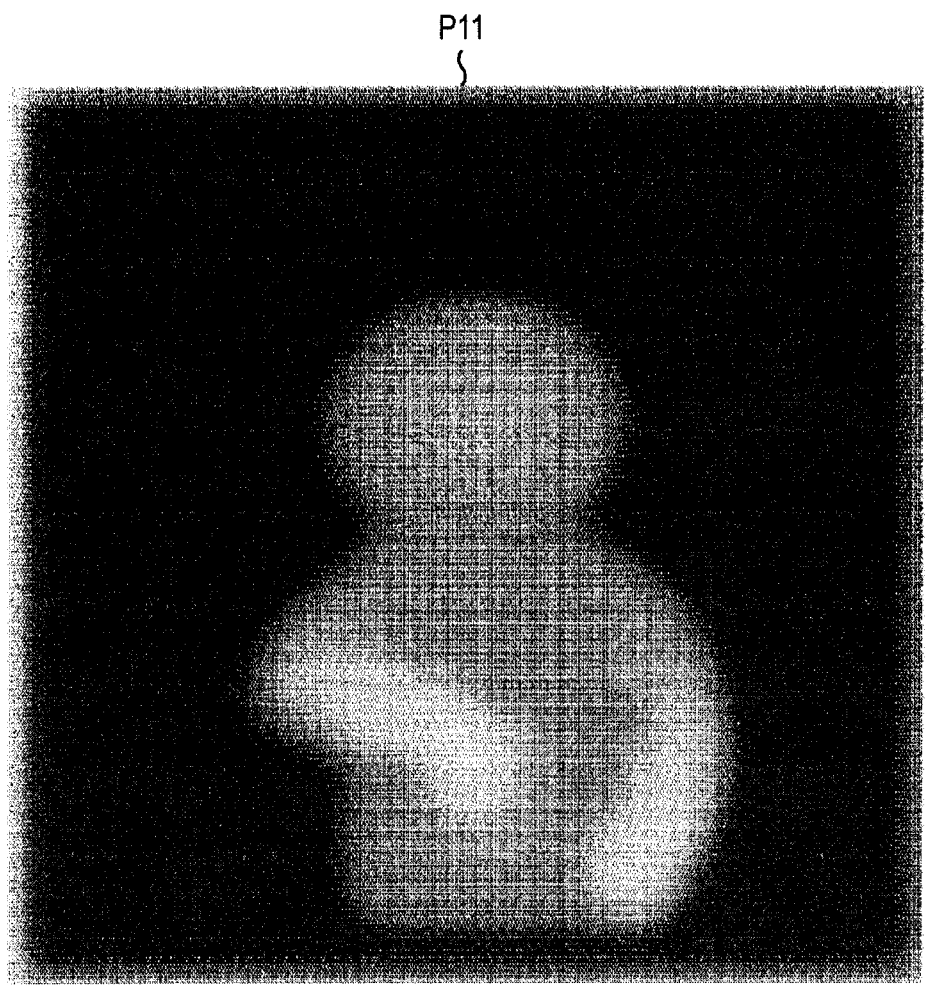
FIG. 4 illustrates a smoothed depth image.

Here, g(x, y) represents the pixel value of the smoothed depth image, f (x, y) represents the pixel value of the depth image before being smoothed, and i and j represent the range in the X direction and in the Y direction in the depth image, respectively. As a result of the processing, for example, in a case where the depth image until being smoothed is the image P2 of FIG. 3, an image P11 that is a smoothed depth image such as that shown in FIG. 4 is obtained. As a result of the image P2 being smoothed, the image P11 becomes a vague image as a whole. When performing smoothing, it is sufficient that the moving average value of the pixel values of the peripheral pixels regarding each pixel is obtained. Since the range of peripheral pixels regarding each pixel may be formed from a plurality of neighboring pixels, the range may be other than a range of 8 pixels×8 pixels.

Figure 5:
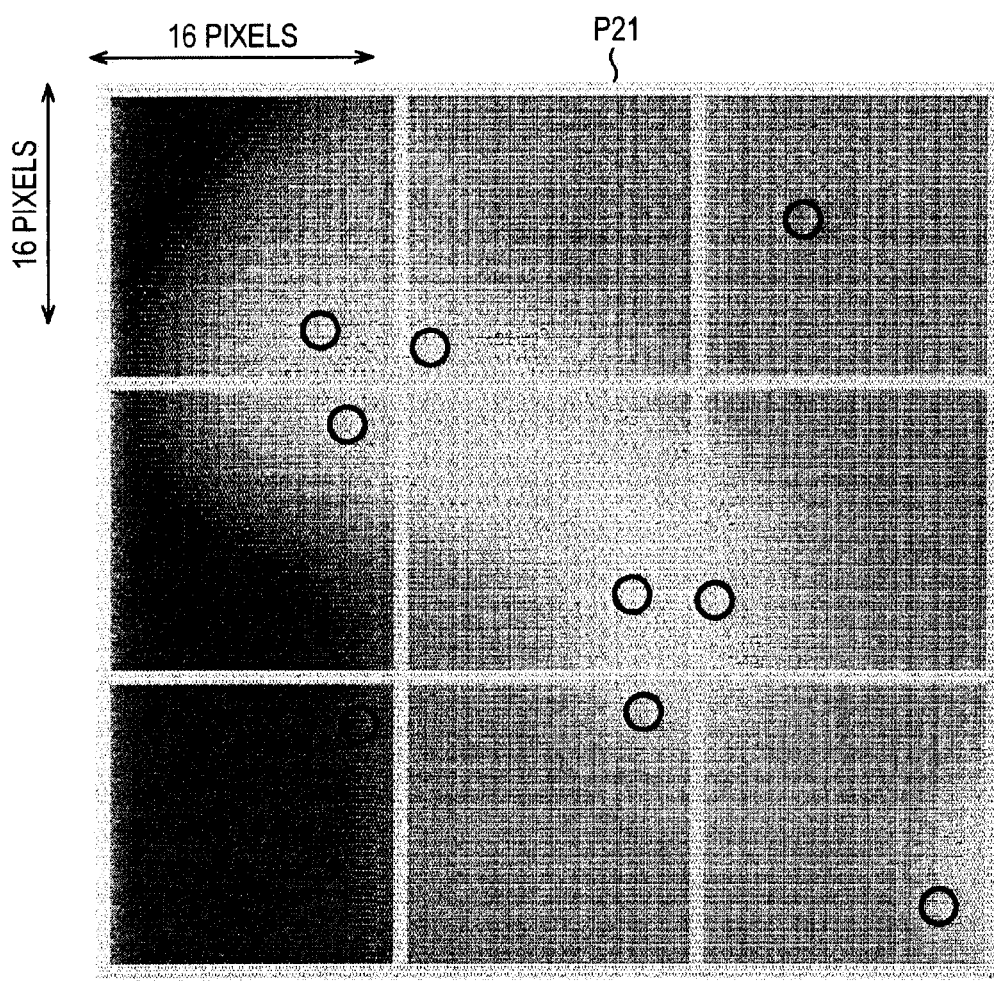
FIG. 5 illustrates a local tip portion.

In step S13, the local tip portion detection unit 102 divides the smoothed depth image into blocks in units of 16 pixels×16 pixels, as, for example, shown by an image P21 shown in FIG. 5, detects, as a local tip portion, a pixel $g(u_{mn}, v_{mn})$ whose pixel value becomes a maximum from among the pixels of the depth image that is smoothed in units of blocks, and supplies the pixel value $g(u_{mn}, v_{mn})$ and the position coordinates ($u_{mn}$, $v_{mn}$) of the pixel to the projecting portion detection unit 103 and the tip tracking unit 105. The pixels indicated by circle marks in FIG. 5 indicate a local tip portion in each block. Here, m and n indicate a coordinate position (m, n) in the X direction and in the Y direction in each block. Furthermore, the size of the block is not limited to 16 pixels×16 pixels, and may be a size other than that.

In step S14, the projecting portion detection unit 103 detects a projecting portion in accordance with whether or not the pixel value of the local tip portion of the block serving as the center becomes a maximum among a total of 9 blocks of 3 blocks×3 blocks, which contain 8 blocks that are adjacent above, below, to the right, to the left, and oblique to each block, and supplies the position coordinates of the pixel position of the projecting portion to the projecting portion tracking unit 104 when the projecting portion is detected.

Figure 6:
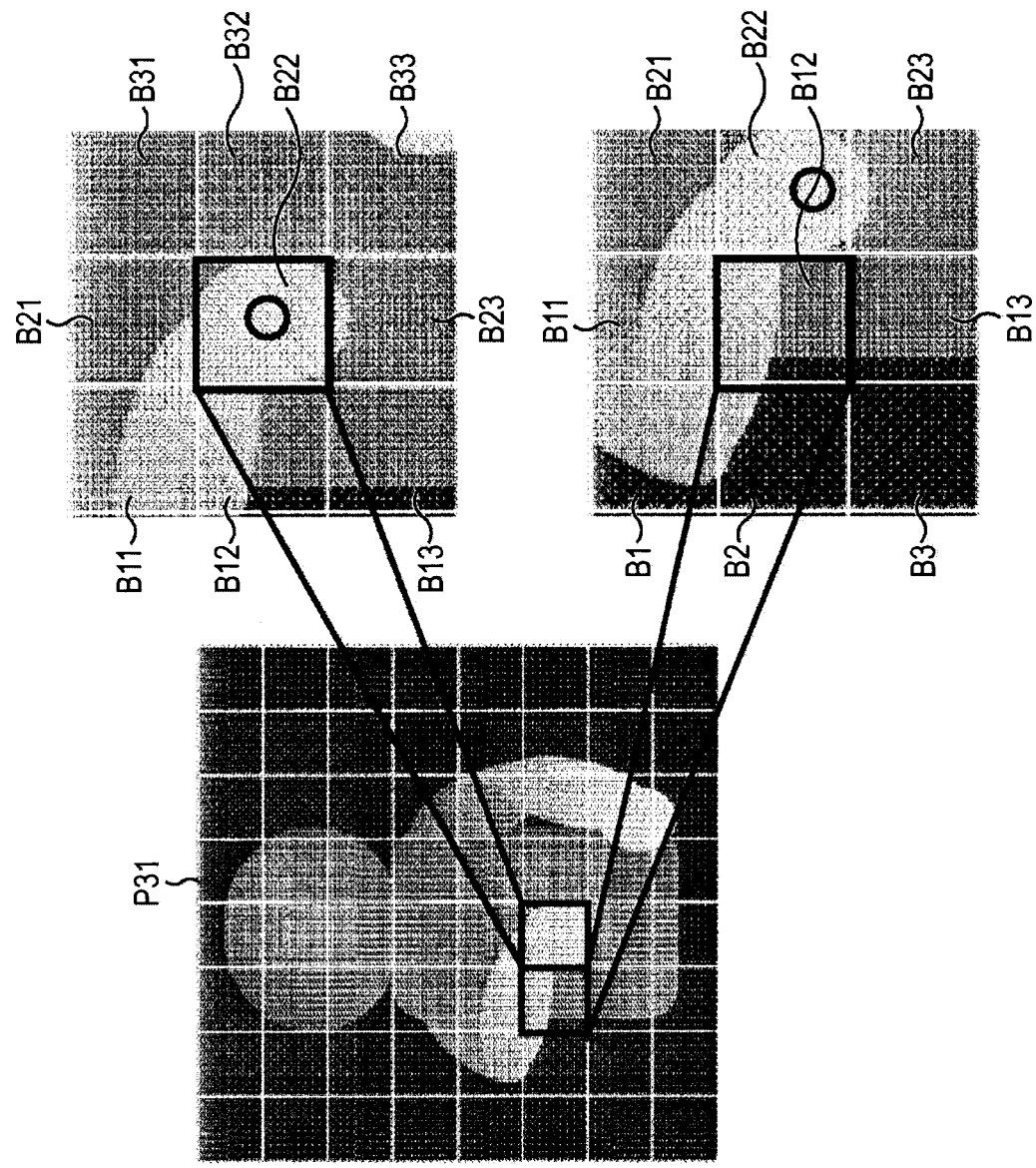
FIG. 6 illustrates a method of detecting projection information.

That is, for example, in a case where an image P31 shown in the left area of FIG. 6 is divided into blocks as indicated using white lines, regarding 9 blocks in the blocks B11 to B13, the B21 to B23, and B31 to B33, in which a block B22 shown in the right upper portion of FIG. 6 is a block of interest among all the blocks of the image P31, since the pixel value of the local tip portion of the block B22 that is a block of interest is a maximum value among the pixel values of the local tip portion of the 9 blocks, the local tip portion of the block B22 is detected as a projecting portion.

On the other hand, regarding 9 blocks in the blocks B1 to B3, B11 to B13, and B21 to B23, in which the block B12 shown in the right low area of FIG. 6 is a block of interest among all the blocks of the image P31, since the pixel value of the local tip portion of the block B12 that is a block of interest is not a maximum value among the pixel values of the local tip portion of the 9 blocks and the pixel value of the local tip portion of the block B22 is a maximum value, the local tip portion of the block B12 is not detected as a projecting portion.

Figure 7:
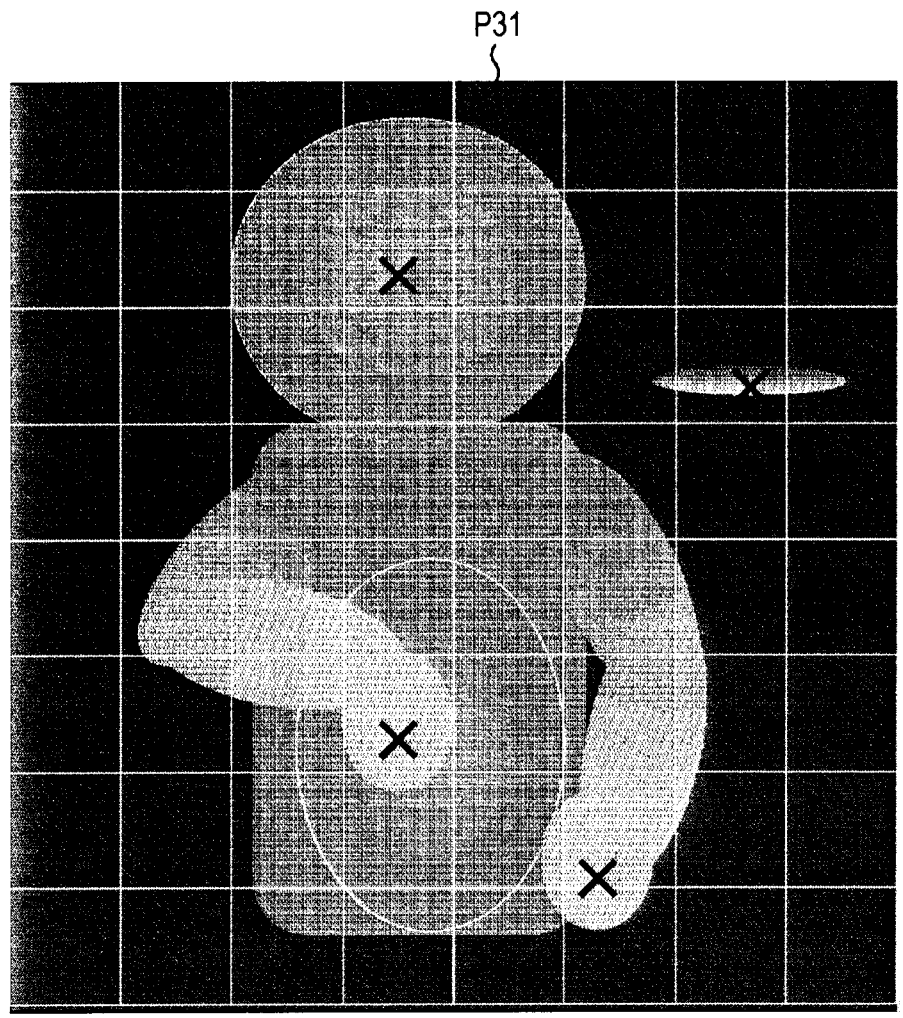
FIG. 7 illustrates a projection information detection result.

For example, as a result of performing the above-mentioned process on all the blocks of the image P31 of FIG. 7 by the projecting portion detection unit 103, local tip portions indicated by x marks in FIG. 7 are detected as projecting portions. In FIG. 7, in the image P31, local tip portions of the face and the right and left hands of the person who is a subject are detected as projecting portions, and also noise generated in the right upper portion at the time of image capture has been erroneously detected as projecting portions.

In step S15, the projection information update unit 111 performs a projection tracking process, determines whether or not the same projecting portion has been continuously detected, and updates the projection information stored in the projection information storage unit 112 in accordance with the determination result.

Projection Tracking Process

Figure 8:
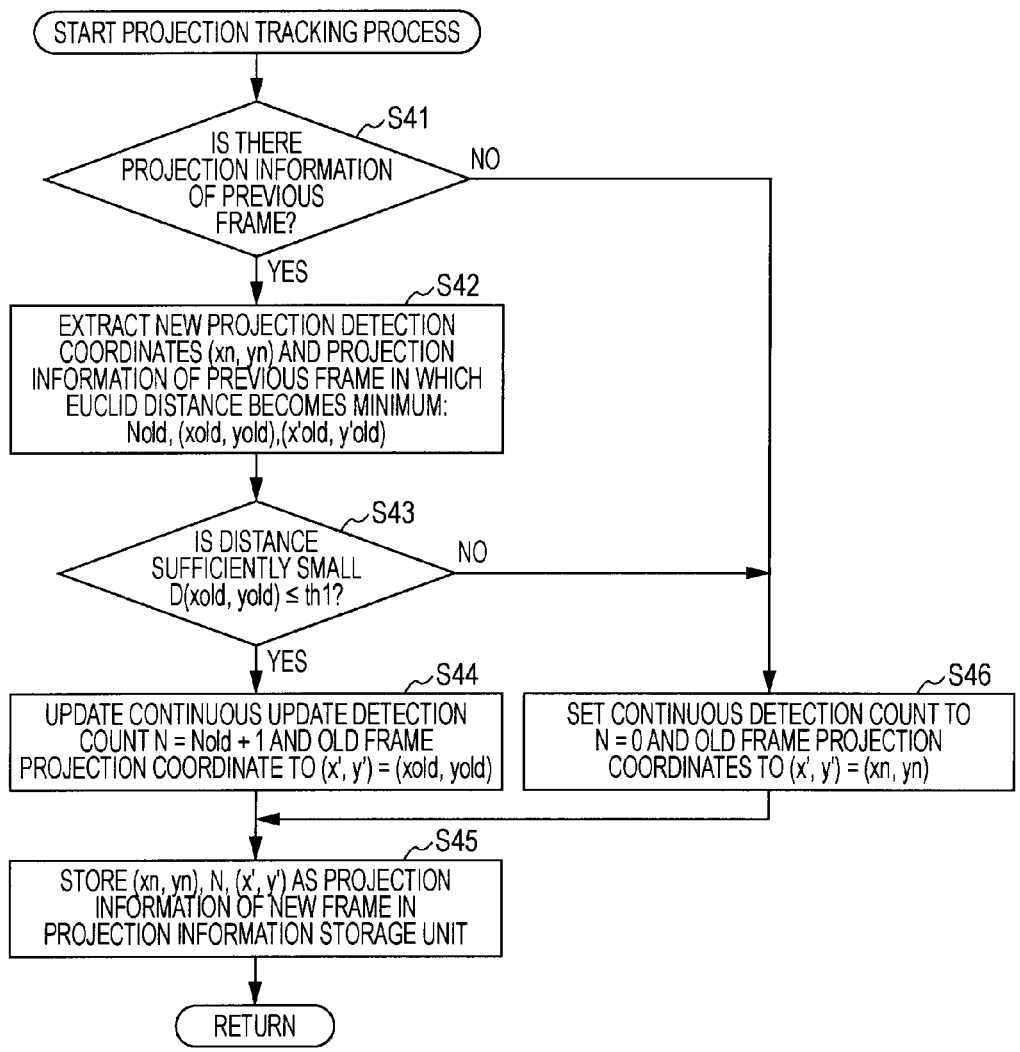
FIG. 8 is a flowchart illustrating a projection tracking process.

Here, a description will be given, with reference to the flowchart of FIG. 8, of a projection tracking process.

Figure 9:
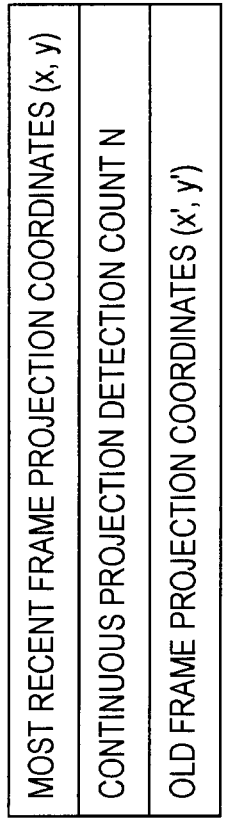
FIG. 9 illustrates the structure of projection information.

In step S41, the projection information update unit 111 accesses the projection information storage unit 112 and determines whether or not the projection information of the previous frame has been registered. In the projection information storage unit 112, projection information such as that shown in FIG. 9 has been registered for each local tip portion that is detected as a projecting portion, and is registered as information for each local tip portion in the frame detected as a projecting portion at first. Projection information regarded as the same projecting portion in subsequent frames is sequentially updated. That is, in FIG. 9, most recent frame projection coordinates (x, y), a continuous projection detection count N, and an old frame projection coordinates (x', y') have been stored from the top. The most recent frame projection coordinates (x, y) are coordinates in the image of the local tip portion detected as a projecting portion in the most recent frame. Furthermore, the continuous projection detection count N is a count in which the local tip portion detected as the same projecting portion has been continuously detected in consecutive frames. In addition, the old frame projection coordinates (x', y') are coordinates in the image of the local tip portion detected as a projecting portion in the immediately previous frame.

Figure 10:
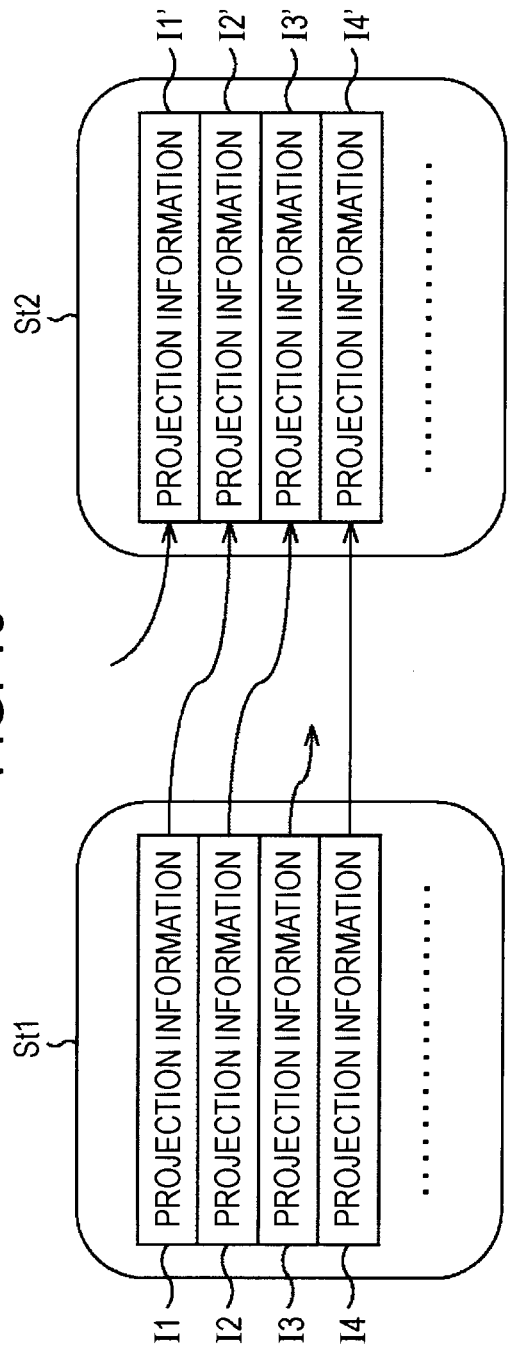
FIG. 10 illustrates an update of projection information.

Furthermore, in the projection information storage unit 112, as shown in FIG. 10, two storage areas are provided, so that the projection information is stored alternately in units of frames. That is, it is assumed that a first surface St1 provided in the projection information storage unit 112 is registered with projection information I1 to I4 as the projection information of the immediately previous frame. In such a case, management is performed in the following manner. A second surface St2 of the projection information storage unit 112 is registered with projection information I1' when, for example, new projection information is detected as the projection information of the next frame. When the same projecting portion as the projection information I1 and I3 is detected, the respective continuous projection detection counts N are incremented by 1 and are updated as projection information I2' and I4'. Since the same projecting portion as the projection information I3 is not detected, the projection information I3 is deleted. Then, regarding the projection information of the still next frame, a process for temporarily clearing the information on the first surface St1 and newly registering information is repeated.

That is, in the new frame, when a projecting portion regarded as the same as the projecting portion detected in the immediately previous frame, the most recent frame projection coordinates (x, y) in the immediately previous frame are overwritten into the old frame projection coordinates (x', y'), and the coordinates of the projecting portion detected in the most recent frame are newly overwritten into the most recent frame projection coordinates (x, y). This operation will be repeated. Furthermore, in a case where the same projecting portion is detected in consecutive frames, the continuous projection detection count N is incremented by 1, and in a case where the same projecting portion is not detected in consecutive frames, the projection information is deleted.

Accordingly, the projection information update unit 111 reads the projection information registered in one of the first surface St1 and the second surface St2 corresponding to the immediately previous frame of the projection information storage unit 112, and determines whether or not the projection information of the previous frame has been registered.

In step S41, in a case where, for example, at least one or more pieces of projection information have been registered, the process proceeds to step S42.

In step S42, the projection information update unit 111 refers to all the most recent frame projection coordinates (x, y) of the projection information of the previous frame, which has been stored in the projection information storage unit 112, and obtains the Euclidean distance d(x, y) from the detected projecting portion detection coordinates $(x_n, y_n)$ by calculating the following equation (2).

$$d(x,y)=\sqrt{((x-x_n)^2+(y-y_n)^2)} \qquad (2)$$

Here, $x_n$ and $y_n$ are the x and y coordinates in the image of the detected projecting portion, respectively. In the following, the most recent frame projection coordinates (x, y) of the previous frame in which the Euclidean distance d(x, y) becomes a minimum is set as coordinates $(x_{old}, y_{old})$ and is set as each element of another projection information corresponding to the coordinates $(x_{old}, y_{old})$; the continuous projection detection count N is set as $N_{old}$; and the old frame projection coordinates (x', y') represents coordinates $(x'_{old}, y'_{old})$.

In step S43, the projection information update unit 111 determines whether or not the Euclidean distance $d(x_{old}, y_{old})$ in which the distance between the newly detected projecting portion and the registered projecting portion becomes a minimum is sufficiently smaller than a predetermined threshold value th1, and whether or not the projecting portions can be regarded as the same projecting portion that has moved between frames. That is, whether or not the projecting portions are projecting portions that can be regarded as having been moved between frames is determined. In step S43, for example, in a case where the Euclidean distance $d(x_{old}, y_{old})$ is sufficiently smaller than the predetermined threshold value th1 and the projecting portions can be regarded as the same projecting portion that has moved between frames, the process proceeds to step S44.

In step S44, the projection information update unit 111 adds 1 to the value of the continuous projection detection count N in the projection information recognized as the same projecting portion, which is continuously detected from the immediately previous frame within the projection information stored in the projection information storage unit 112, and updates the continuous projection detection count N (=$N_{old}$+1). Furthermore, the projection information update unit 111 updates the old frame projection coordinates $(x'_{old}, y'_{old})$ in the projection information recognized as the same projecting portion by using the most recent frame projection coordinates ($x_{old}$, $y_{old}$).

In step S45, the projection information update unit 111 updates the most recent frame projection coordinates ($x_{old}$, $y_{old}$) in the projection information recognized as the same projecting portion, which is continuously detected from the immediately previous frame, within the projection information stored in the projection information storage unit 112 by using the projecting portion detection coordinates ($x_n$, $y_n$) of the local tip portion detected as the projecting portion of the frame at this moment. The projection information update unit 111 updates the projection information by using the most recent frame projection coordinates ($x_n$, $y_n$), the continuous projection detection count N, and the old frame projection coordinates ($x_{old}$, $y_{old}$), which are updated as described above, and causes the projection information storage unit 112 to store the projection information.

On the other hand, in step S41, in a case where the projection information has not been registered or in a case where, in step S43, for example, the Euclidean distance $d(x_{old}, y_{old})$ is not sufficiently smaller than the predetermined threshold value th1 and the projecting portions is difficult to be regarded as the same projecting portion that has moved between frames, the process proceeds to step S46.

In step S46, the projection information update unit 111 initializes the continuous projection detection count N to N=0, generates new projection information by using both the most recent frame projection coordinate value (x, y) and the old frame projection coordinate value (x', y') as the projecting portion detection coordinates ($x_n$, $y_n$), and causes the projection information storage unit 112 to store the projection information. That is, for example, the projection information is stored as new projection information like the projection information 11' described with reference to FIG. 10.

The reason why the old frame projection coordinate value (x', y') is updated using the projecting portion detection coordinates ($x_n$, $y_n$) is that since the projection information is new projection information, and the projecting portion coordinate value of the immediately previous frame does not exist, the projection information should be made blank, but the projection information is made not to become unstable. At this time, in consecutive frames, the projection information that has not been continuously detected is not updated as projection information, and is practically deleted like, for example, the projection information I3 described with reference to FIG. 10.

As a result of the above processing, when the projecting portions that are detected as projecting portions from among the local tip portions are continuously detected between frames, the continuous projection detection count N is sequentially counted up. Also, the most recent frame projection coordinate value and the old frame projection coordinate value are updated in such a manner as to correspond to each other, and are stored as projection information in the projection information storage unit 112. Furthermore, projection information that is not detected as the same projection information between consecutive frames is deleted.

Figure 2:
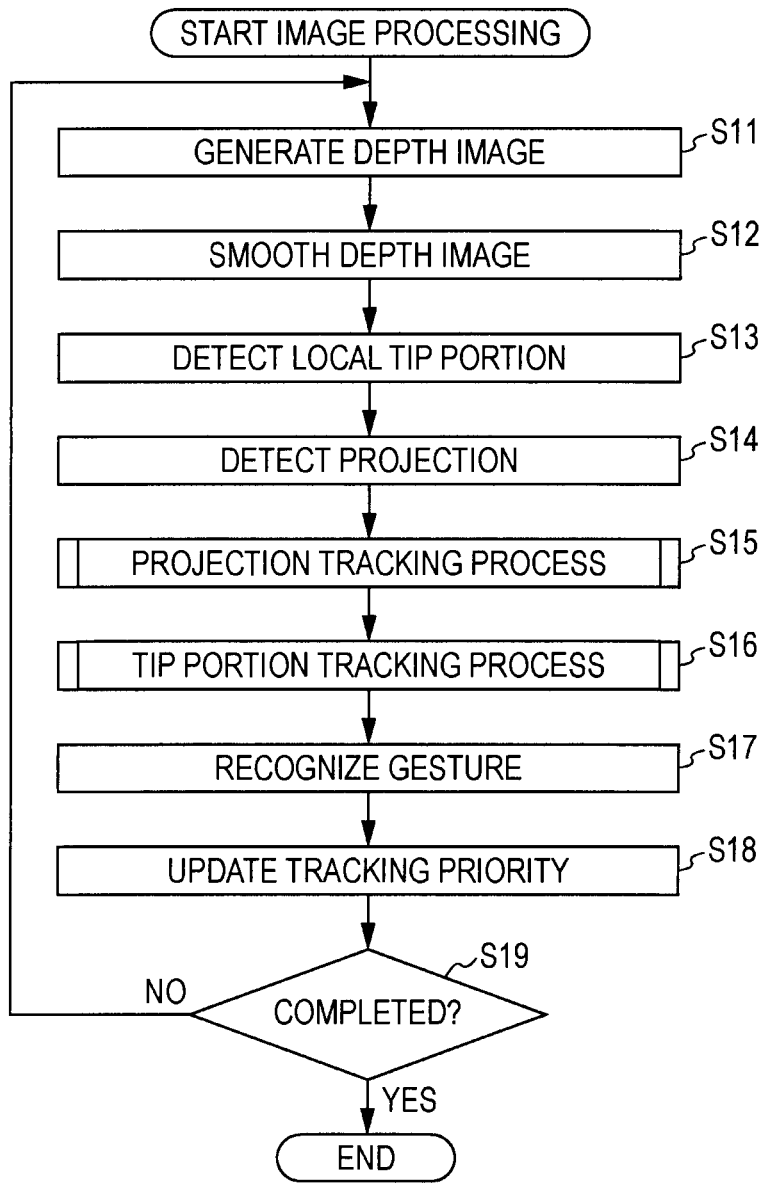
FIG. 2 is a flowchart illustrating image processing performed by the image processing apparatus of FIG. 1.

Here, the description returns to the flowchart of FIG. 2.

When the projection information of the projecting portion that is sequentially detected is updated and stored in the projection information storage unit 112 by the projection tracking process of step S15, the process proceeds to step S16.

In step S16, the tip portion information update unit 121 of the tip tracking unit 105 performs a tip tracking process, sequentially updates tip portion information, and causes the tip portion information storage unit 122 to store the tip portion information.

Tip Portion Tracking Process

Here, a description will be given, with reference to the flowchart of FIG. 11, of a tip portion tracking process.

In step S71, the tip portion information update unit 121 initializes the update flags f of all the tip portion information stored in the tip portion information storage unit 122 to 0 indicating no update.

Figures 12, 13:
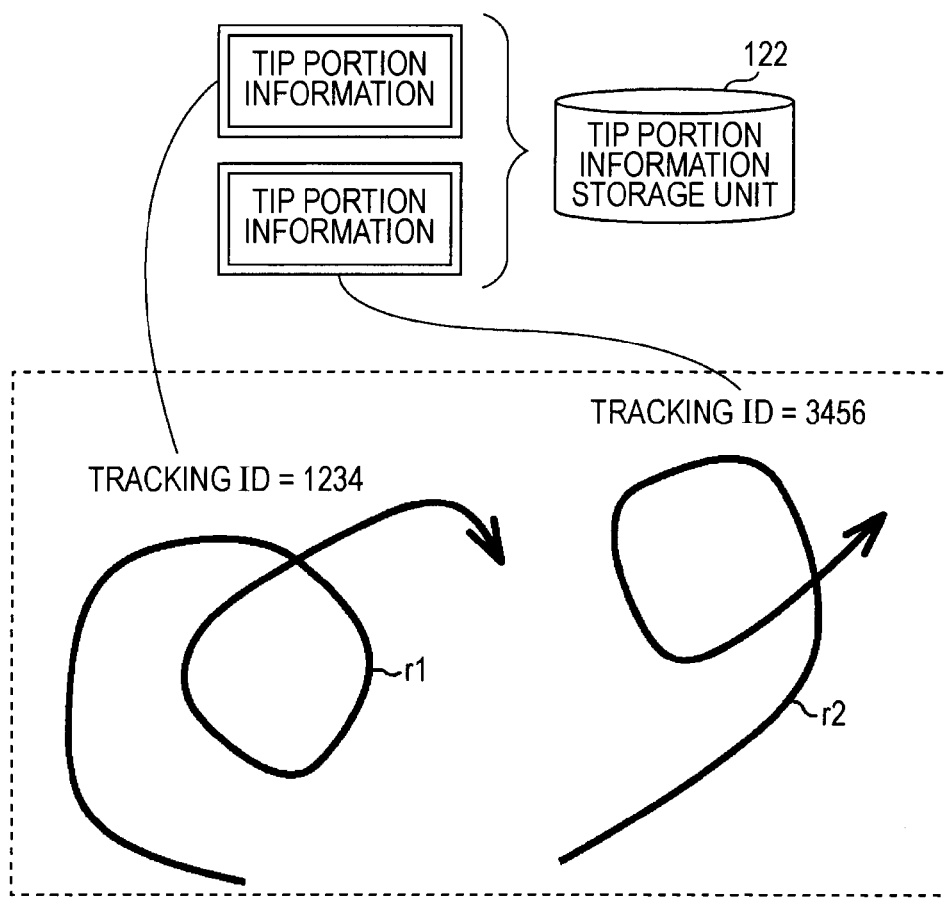
FIG. 12 illustrates the structure of tip portion information.
FIG. 13 illustrates the tip portion information and tracking IDs.

The tip portion information is information that is managed when the position of the tip portion, which is the tip of the action of the subject making a gesture, for example, the fingers or the fingertip, is to be tracked. In a case where the projecting portion is continued to be detected, regarding the tracking of the tip portion, the position information on the projecting portion that is continued to be detected is used to track the position of the tip portion. Furthermore, in a case where the projecting portion that has been temporarily detected is placed in a state in which the projecting portion is not detected, for the tracking of the tip portion, the position of the local tip portion close to the position of the tip portion that has been detected immediately before is used. More specifically, the tip portion information is information for identifying a tip portion to be tracked when the position of the tip portion is to be tracked. For example, as shown in FIG. 12, the tip portion information is formed of a tracking ID, the most recent frame coordinates (x, y), a likelihood p (0≤p≤1.0), and an update flag f (f=0: not update, f=1: updated).

$$p = k0 \times 1.0 + (1.0 - k0) \times p \quad (3)$$

Here, p denotes the likelihood, k0 is the constant indicating a ratio at which the likelihood is increased when the tip portion is continuously detected as a projecting portion, for example, k0=0.2.

Figure 14:
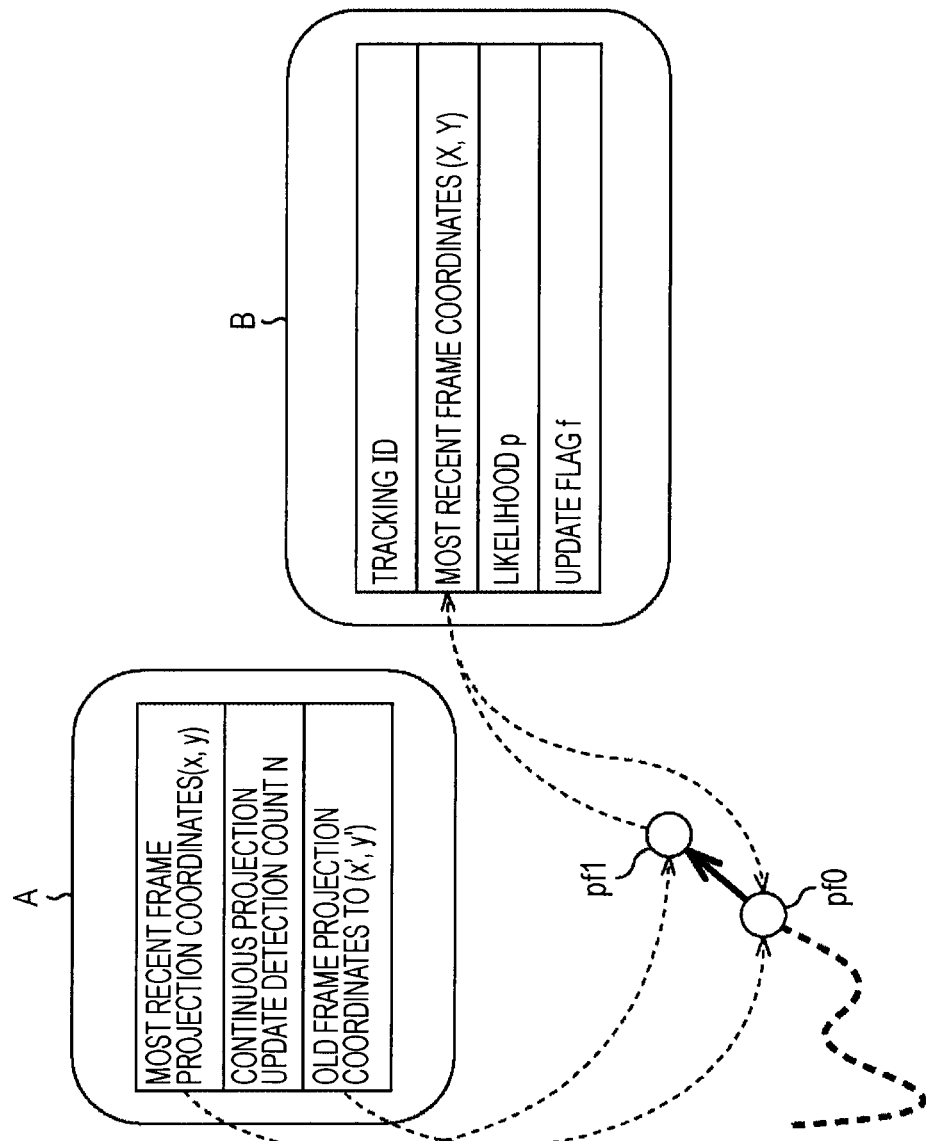
FIG. 14 illustrates an update of the tip portion information.

That is, for example, in a case where the most recent frame coordinates (x, y) before being updated, which are contained in tip portion information B as shown in FIG. 14, match the old frame projection coordinates (x', y') indicating the coordinate position of the projecting portion Pf0 in the immediately previous frame, which is contained in projection information A, it is assumed that the tip portion to be tracked as a trajectory matches the projecting portion represented by the projection information. Thus, by replacing the frame projection coordinates with the most recent frame projection coordinates of the projection information A in a projecting portion Pf1 in the most recent frame, the most recent frame coordinates (x, y) of the tip portion information B is updated.

Projection Undetected Tip Portion Information Update Process

Figure 15:
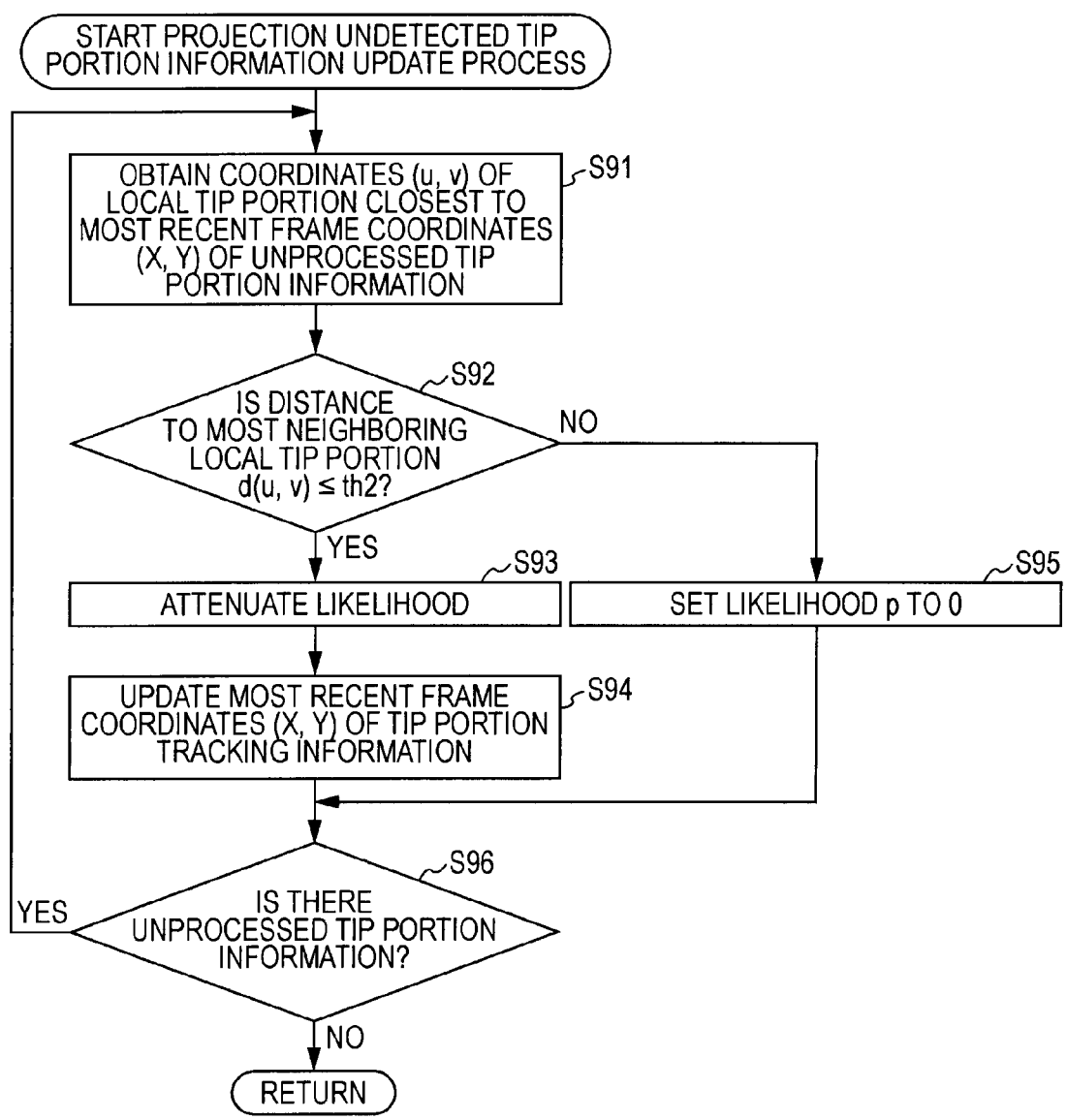
FIG. 15 is a flowchart illustrating a projection undetected tip portion information update process.

Here, with reference to the flowchart of FIG. 15, a projection not-yet-detected tip portion information update process will be described.

In step S91, the tip portion information update unit 121 sets one of the not-yet-processed tip portion information, in which the update flag f has been set to 0, to tip portion information for which processing is to be performed, and obtains the Euclidean distance d between the most recent frame coordinates (x, y) and the coordinates of all the local tip portions that are supplied from the local tip portion detection unit 102. Then, the tip portion information update unit 121 obtains coordinates (u, v) of the local tip portion, in which the obtained Euclidean distance d becomes a minimum. The Euclidean distance d can be obtained by an arithmetic operation similar to the above-mentioned equation (2).

In step S92, the tip portion information update unit 121 determines whether or not the local tip portion in which the Euclidean distance d(u, v) that becomes a minimum is sufficiently smaller than a predetermined threshold value th2 and the Euclidean distance becomes a minimum is the coordinate position in the most recent frame of the tip portion of the trajectory identified by the tracking ID.

When it is determined in step S92 that, for example, the Euclidean distance d(u, v) that becomes a minimum is sufficiently smaller than the predetermined threshold value th2, and the local tip portion in which the Euclidean distance becomes a minimum is at a coordinate position in the most recent frame of the tip portion of the trajectory identified by the tracking ID, the process proceeds to step S93.

In step S93, the tip portion information update unit 121 causes the coordinates (u, v) of the local tip portion to be reflected as the most recent frame coordinates (x, y) in the tip portion information to be processed.

In step S94, the tip portion information update unit 121 attenuates the likelihood in accordance with an arithmetic operation indicated by the following equation (4). At this time, the tip portion information update unit 121 sets the update flag f to 1 indicating "updated".

$$p=(1.0-k1) \times p \qquad (4)$$

Here, k1 is the constant that defines the attenuation ratio of the likelihood when a projecting portion is not detected, for example, may be k1=0.2.

On the other hand, when, in step S92, for example, the Euclidean distance d(u, v) that becomes a minimum is not sufficiently smaller than the predetermined threshold value th2, and the local tip portion in which the Euclidean distance becomes a minimum is difficult to be regarded as the coordinate position in the most recent frame of the tip portion of the trajectory identified by the tracking ID, the process proceeds to step S95.

Since a local tip portion has not been detected in the vicinity of the tip portion information for which processing is to be performed, in step S95, the tip portion information update unit 121 assumes that the tip portion is an invalid tip portion, sets the likelihood p=0, and sets the update flag f to 1 indicating updated.

In step S96, the tip portion information update unit 121 determines whether or not the tip portion information that has not yet been processed, in which the update flag f has been set to 0, exists. In a case where the tip portion information that has not yet been processed exists, the process returns to step S91. That is, the processing of steps S91 to S96 is repeated until the not-yet-processed tip portion information that has not been updated, in which the update flag f has been set to 0, becomes nonexistent. Then, when it is determined in step S96 that there is no not-yet-processed tip portion information, which has not been updated, in which the update flag f has been set to 0, the processing is completed.

That is, as a result of the above processing, regarding the tip portion information having no match with projection information, in a case where the Euclidean distance that becomes a minimum is smaller than the predetermined threshold value th2 among all the local tip portions, the tip portion information is set to the coordinates of the local tip portion, which can be regarded as the coordinates in the most recent frame of the tip portion information, and is updated; otherwise, the likelihood p is set to 0.

Figure 11:
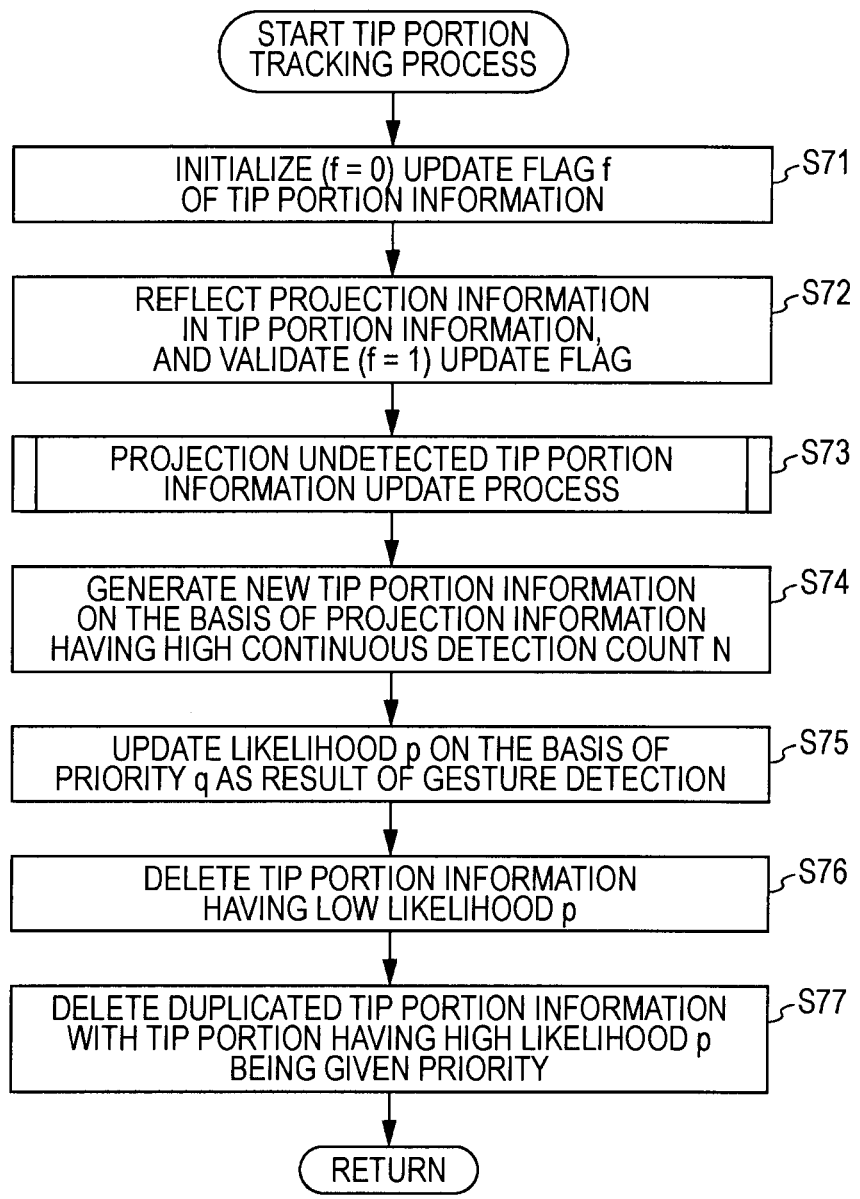
FIG. 11 is a flowchart illustrating a tip portion tracking process.

Here, the description returns to the flowchart of FIG. 11.

As a result of the process of step S73, when the most recent frame coordinates are updated using the local tip portion with regard to the tip portion information in which the most recent frame coordinates could not be updated using the projection information, the process proceeds to step S74.

Figure 16:
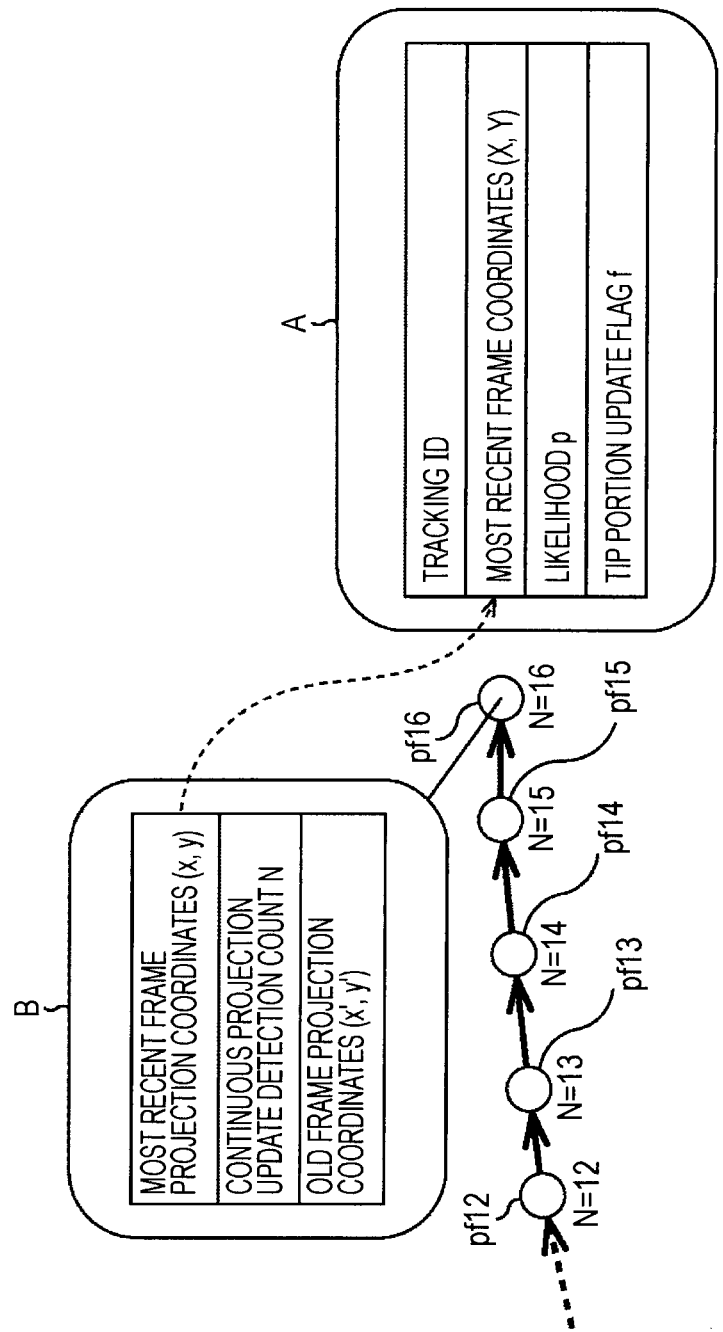
FIG. 16 illustrates the generation of new tip portion information.

In a case where no corresponding tip portion information in which the continuous detection count N is higher than a predetermined detection count (for example, 16) exists within the projection information stored in the projection information storage unit 112, in step S74, the tip portion information update unit 121 generates new tip portion information by using the projection information in which the continuous detection count N is higher than the predetermined detection count. That is, as shown in the left area of FIG. 16, when the most recent frame projecting portion of the projection information is continuously detected between consecutive frames like projecting portions Pf1, . . . Pf12 to Pf16, and the continuous projection detection count N exceeds a predetermined detection count, the tip portion information update unit 121 assumes that a trajectory to be tracked, that is, a tip portion, is newly generated. Then, the tip portion information update unit 121 sets a new tracking ID, and uses, as the most recent frame coordinates, the most recent frame projection coordinates of the projection information in which the continuous detection count N is higher than the predetermined detection count. Furthermore, the tip portion information update unit 121 sets the likelihood p of the new tip portion information to an initial value p=k2 (k2 is, for example, 0.6), and sets the update flag f to 1 indicating "updated". Then, the tip portion information update unit 121 causes the tip portion information storage unit 122 to store therein the generated new tip portion information.

In step S75, the tip portion information update unit 121 reads the priority q that is set on the basis of the detection result of the gesture trajectory detection unit 106, which has been registered for each tracking ID, the priority being stored in the tracking priority storage unit 108, and updates the likelihood p of the tip portion information corresponding to the tracking ID in accordance with the following equation (5). By updating the likelihood p on the basis of the priority q as described above, the likelihood p of the tip portion information for which a gesture has been detected by the gesture trajectory detection unit 106 is increased.

$$p=k3 \times q+(1.0-k3) \times p \qquad (5)$$

Here, k3 is the ratio at which the priority q set as a result of gesture detection is reflected in units of frames, and may be, for example, k3=0.2. The setting of the priority q will be described later.

In step S76, the tip portion information update unit 121 deletes the tip portion information in which the likelihood p is lower than a predetermined threshold value k4 within all the tip portion information stored in the tip portion information storage unit 122 from the tip portion information storage unit 122. The threshold value k4 is a threshold value for the likelihood, by which the tip portion is regarded as an effective tip portion, and may be, for example, k4=0.4.

In step S77, the tip portion information update unit 121 searches for tip portion information in which the most recent frame coordinates (x, y) are duplicated from within the tip portion information stored in the tip portion information storage unit 122. Then, in a case where a plurality of the tip portion information in which the most recent frame coordinates (x, y) are duplicated (a plurality of tracking IDs are assigned) exist, the tip portion information update unit 121 deletes, from the tip portion information storage unit 122, the duplicated tip portion information other than one piece of tip portion information having the highest likelihood p.

Figure 17:
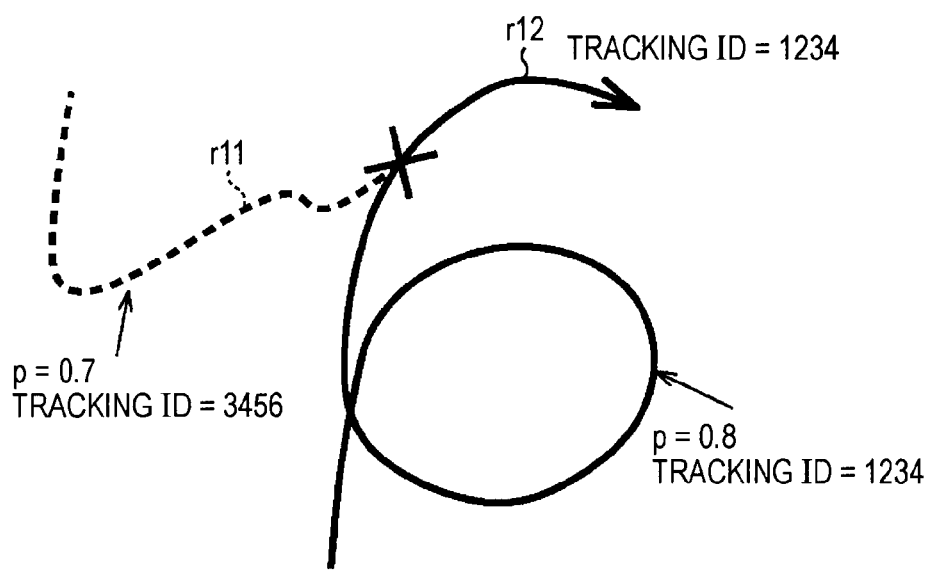
FIG. 17 illustrates duplicate tip portion information.

That is, for example, as shown in FIG. 17, in a case where a trajectory r11 that is identified using a tracking ID1234, and a trajectory r12 that is identified using a tracking ID3456 exist, the most recent frame coordinates coincide at the position indicated by a x mark in the figure. In such a case, since the trajectory to be tracked may be one, the tip portion information update unit 121 compares the likelihood p=0.8 contained in the tip portion information of the tracking ID1234 with the likelihood p=0.7 contained in the tip portion information of the tracking ID3456, and deletes the tip portion information of the tracking ID3456 from the tip portion information storage unit 122, leaving only the tip portion information of the tracking ID1234 having a high likelihood p.

As a result of the above processing, the information of the most recent frame coordinates of the tip portion information is sequentially updated for each frame and is stored in the tip portion information storage unit 122.

Here, the description returns to the flowchart of FIG. 2.

When the tip portion information that is sequentially stored in the tip portion information storage unit 122 is sequentially updated in units of frames, which is performed by the tip portion tracking process of step S16, the process proceeds to step S17.

In step S17, the gesture trajectory detection unit 106 sequentially reads the most recent frame coordinates of the tip portion information that is sequentially stored in the tip portion information storage unit 122 in units of tracking ID units, and thus detects the frame coordinates as the trajectory of a part recognized as a tip portion. As a result, it becomes possible to recognize a gesture in accordance with, for example, a hidden Markov model (HMM) on the basis of the information on the trajectory.

Figures 18, 19:
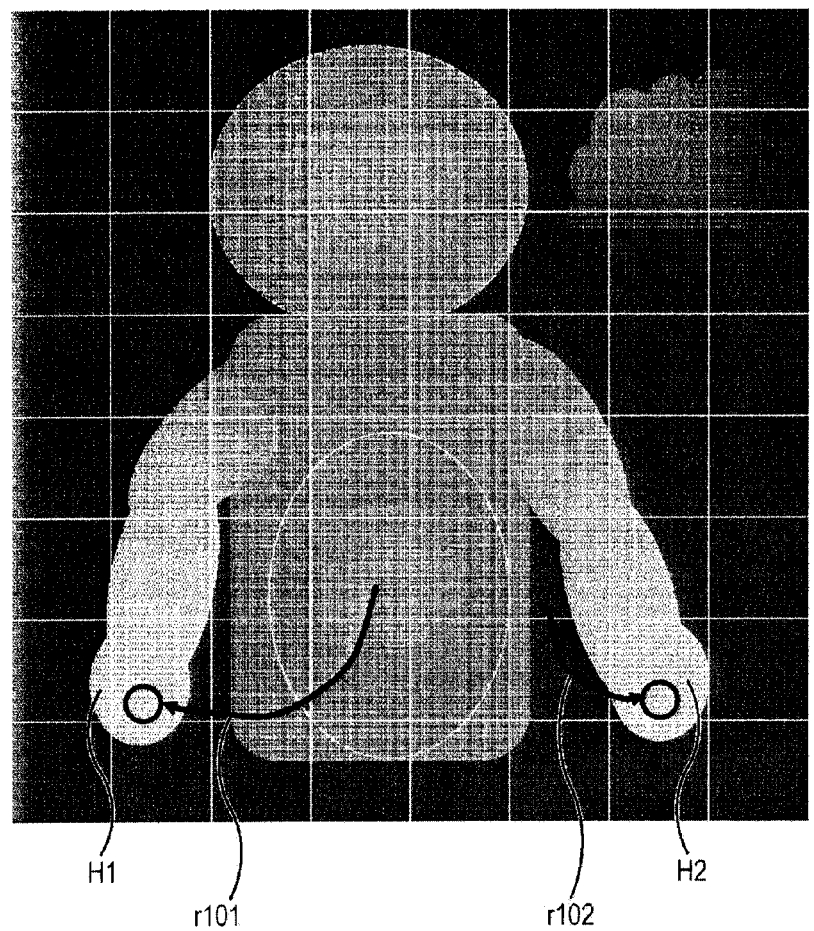
FIG. 18 illustrates a gesture that is detected as a trajectory.
FIG. 19 illustrates tracking priority information.

That is, the most recent frame coordinates of the tip portion information are sequentially read in units of frames for each tracking ID. Consequently, by sequentially storing and connecting the information on the most recent frame coordinates that are read in units of frames, the right and left hands H1 and H2 of the person are recognized as tip portions, for example, as shown in FIG. 18, and the trajectories are obtained like trajectories r101 and r102. The gesture trajectory detection unit 106 detects a gesture on the basis of the trajectory and outputs the information on the detected gesture, and also supplies the information on the detected gesture and the tracking ID used to identify the tip portion information that is contributed to the detection of the gesture to the tracking priority setting unit 107. In the case of in the middle of making a gesture, the tip portion is not recognized as a gesture. However, also in this case, the gesture trajectory detection unit 106 supplies only the information on the trajectory to the additional priority setting unit 107 on the basis of the tracking ID.

Figure 20:
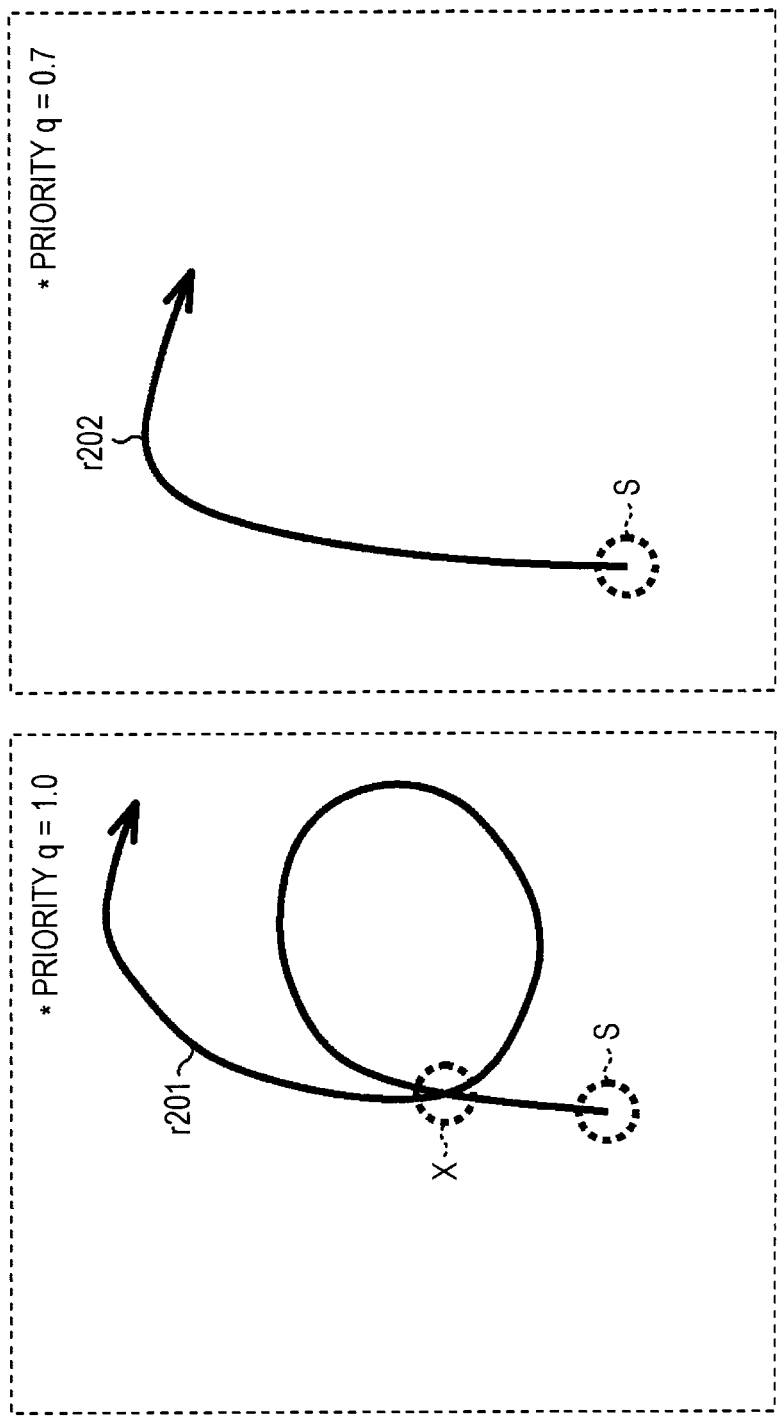
FIG. 20 illustrates a method of setting a tracking priority.

In step S18, the tracking priority setting unit 107 sets a priority q on the basis of the gesture which is the detection result of the gesture trajectory detection unit 106 and the tracking ID contributed to the detection of the gesture, and, for example, as shown in FIG. 19, causes the tracking priority storage unit 108 to store therein the information on the set priority q in such a manner as to correspond to the tracking ID. The setting of the priority q may be set as follows. For example, as shown in the left area of FIG. 20, an approximate circle is drawn from the starting point. Regarding a tip portion forming a trajectory from which a gesture such as an intersecting trajectory r201 is detected, the priority q is set to q=1.0. Regarding a tip portion forming a trajectory from which a gesture has not been detected like a trajectory r202 that is drawn in an arch shape from the starting point, as shown in the right area of FIG. 20, the priority q may be set to q=0.7. As a result of the priority q being set to be high with respect to the tip portion that contributed to the detection of the gesture in this manner, as described above, the likelihood p is set to be high. In contrast, as a result of the priority q being set to be low with respect to the tip portion that does not contribute to the gesture, the likelihood is set to be low.

In step S19, the depth image generation unit 101 determines whether or not the supply of the input image is stopped and the processing is completed. When it is determined that the input images have been supplied in sequence and the processing has not been completed, the process returns to step S11. That is, the processing of steps S11 to S19 is repeated until an instruction of stopping the processing is given. Then, when the instruction of stopping the processing is given, such as the supply of the input image being stopped, the processing is completed.

That is, the local tip portion is obtained from the depth image. If the local tip portion having a value higher than the value of the local tip portion of the peripheral blocks thereof is detected as a projecting portion, and the projecting portion of the most recent frame can be detected within a predetermined range in the vicinity of the position of the projecting portion that is detected in the immediately previous frame, it is assumed that the tip portion has been continuously detected in units of frames. The position of the projecting portion that is continuously detected in the manner described above is tracked as the position of the tip portion, and a gesture is recognized from the trajectory, thereby making it possible to reduce the processing load and also accurately recognize a gesture.

In addition, even when a state in which a local tip portion is difficult to be continuously detected as a projecting portion is reached, if the local tip portion of the most recent frame can be detected in a predetermined range in the vicinity of the position of the projecting portion that is detected in the immediately previous frame, it is assumed that the tip portion has been continuously detected in units of frames. By tracking the position of the local tip portion that is continuously detected in the manner described above, it becomes possible to performing tracking, for example, even if the fingers making a gesture are not at a position closest to the image-capturing position, and it becomes possible to recognize a gesture with higher accuracy.

Furthermore, a likelihood has been set in the information of the tip portion. Consequently, in a case where a projecting portion is continuously detected and the position of the tip portion has been updated on the basis of the information of the coordinate position of the projecting portion or the position of the tip portion is contributed to the trajectory that is detected as a gesture, the likelihood is increased. As a result, the information of the tip portion that is necessary to detect a gesture is continued to be tracked. In contrast, in a case where a projecting portion has not been continuously detected, the position of the tip portion has been updated using the information of the coordinate position of the local tip portion or the position of the tip portion is not contributed to the trajectory that is detected as a gesture, the likelihood is attenuated. Consequently, the information of the tip portion that is necessary to detect a gesture will be erased in due time. As a result, the tracking of the necessary information of the tip portion is continued, and the unnecessary information of the tip portion will be deleted. Consequently, it becomes possible to recognize a gesture with high accuracy by using the necessary information of the tip portion.

The above-described series of image processing can be performed by hardware and also by software. When the series of processing is to be performed by software, a program constituting the software is installed from a recording medium into a computer that is incorporated in dedicated hardware, or such a program is installed from a recording medium into a general-purpose computer capable of performing various processes by installing various programs.

Figure 21:
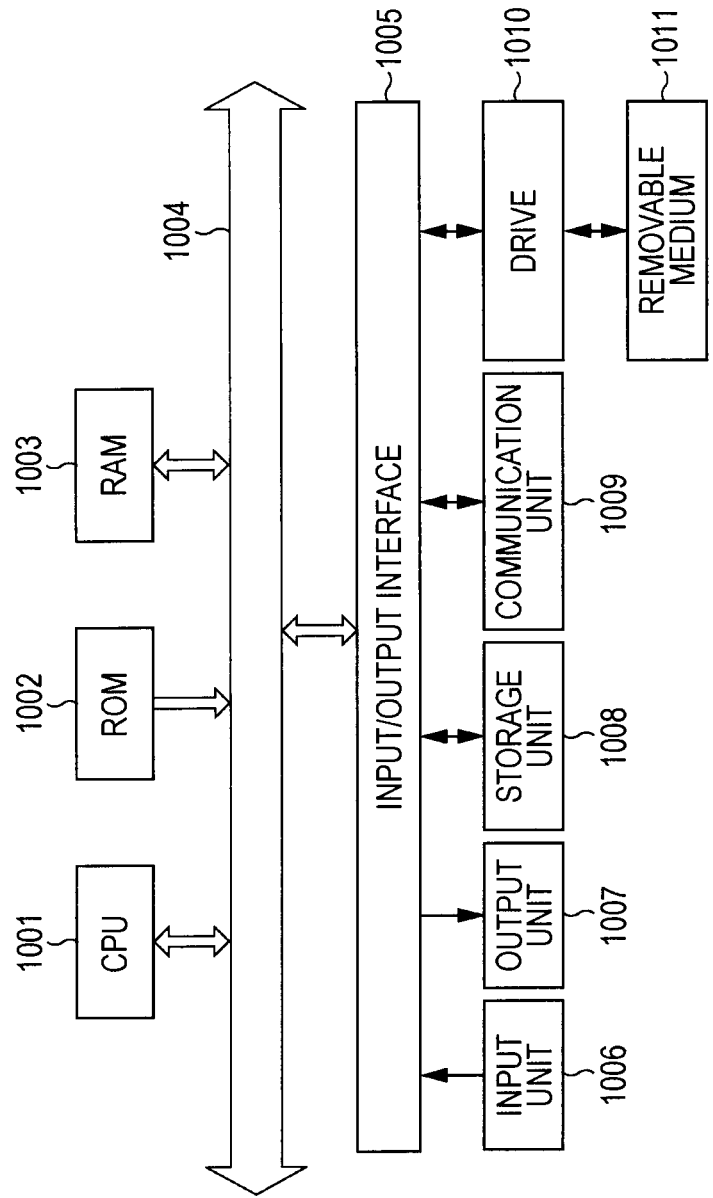
FIG. 21 illustrates an example of the configuration of a general-purpose personal computer.

FIG. 21 illustrates an example of the configuration of a general-purpose personal computer. The personal computer has incorporated therein a central processing unit (CPU)

1001. An input/output interface 1005 is connected to the CPU 1001 through a bus 1004. A read only memory (ROM) 1002 and a random access memory (RAM) 1003 are connected to the bus 1004.

An input unit 1006 including input devices, such as a keyboard and a mouse through which a user inputs operation commands, an output unit 1007 that outputs a processing operation screen and an image of a processing result to a display device, a storage unit 1008 including a hard disk drive for storing programs and various data, and the like, and a communication unit 1009, which includes a local area network (LAN) adapter, that performs a communication process through a network typified by the Internet, are connected to the input/output interface 1005. Furthermore, a drive 1010 that reads and writes data from and to a removable medium 1011, such as a magnetic disk (including a flexible disc), an optical disc (including a CD-ROM (Compact Disc-Read Only Memory), a DVD (Digital Versatile Disc)), a magneto-optical disc (including an MD (Mini Disc)), or a semiconductor memory is connected thereto.

The CPU 1001 performs various processing in accordance with the program stored in the ROM 1002, or a program which is read from the removable medium 1011, such as a magnetic disk, an optical disc, a magneto-optical disc, or a semiconductor memory, which is installed into a storage unit 1008, and which is loaded from the storage unit 1008 to the RAM 1003. Furthermore, the RAM 1003 stores therein as appropriate data necessary to perform various processing by the CPU 1001, or the like.

In this specification, steps describing a program recorded on a recording medium include processes that are performed in a time-series manner according to the written order, but also processes that are performed in parallel or individually although they may not be performed in a time-series manner.

The present disclosure contains subject matter related to that disclosed in Japanese Priority Patent Application JP 2010-263805 filed in the Japan Patent Office on Nov. 26, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a depth image obtaining unit configured to obtain a depth image including information on distances from an image-capturing position to a subject in a two-dimensional image to be captured, the depth image being in units of pixels of the image;
a local tip portion detection unit configured to detect a portion of the subject at a depth and a position close from the image-capturing position as a local tip portion in units of blocks formed every plurality of adjacent pixels in the depth image;
a projecting portion detection unit configured to detect, in a case where, when each of the blocks is set as a block of interest, the local tip portion of the block of interest in an area formed of the plurality of blocks adjacent to the block of interest, including the block of interest, becomes a local tip portion closest from the image-capturing position in the region, the local tip portion as a projecting portion; and
a tracking unit configured to continuously track the position of the projecting portion detected by the projecting portion detection unit.

2. The image processing apparatus according to claim 1, further comprising a gesture detection unit configured to recognize a trajectory of the position of the projecting portion tracked by the tracking unit as an action of the subject to be image-captured in the image, and detect a gesture made by the action of the subject on the basis of the trajectory.

3. The image processing apparatus according to claim 2, wherein the tracking unit starts tracking of the position of the projecting portion that is detected by the projecting portion detection unit, thereafter tracks, when the projecting portion is continuously detected in the time direction within a predetermined range in the vicinity of the position of the projecting portion detected immediately before, the position of the projecting portion that is continuously detected in the time direction within the predetermined range in the vicinity of the position of the projecting portion detected immediately before, and tracks, when the projecting portion is not continuously detected in the time direction within the predetermined range in the vicinity of the position of the projecting portion detected immediately before, the position of the local tip portion that is continuously detected in the time direction in the predetermined range in the vicinity of the position of the projecting portion detected immediately before as the position of the projecting portion.

4. The image processing apparatus according to claim 3, wherein the tracking unit tracks either the position of the projecting portion tracked by the tracking unit or the position of the local tip portion as the position of the tip portion, sets a likelihood in each of the tip portions, and ends the tracking of the tip portion in which the likelihood has become smaller than a predetermined threshold value.

5. The image processing apparatus according to claim 4, further comprising a tracking priority setting unit configured to set a tracking priority of the tip portion in accordance with a gesture detected by the gesture detection unit on the basis of the trajectory of the tip portion,
wherein the tracking unit sets the respective likelihoods on the basis of the corresponding tracking priorities of the respective tip portions.

6. An image processing method for use with an image processing apparatus including
a depth image obtaining unit configured to obtain a depth image including information on distances from an image-capturing position to a subject in a two-dimensional image to be captured, the depth image being in units of pixels of the image,
a local tip portion detection unit configured to detect a portion of the subject at a depth and a position close from the image-capturing position as a local tip portion in units of blocks formed every plurality of adjacent pixels in the depth image,
a projecting portion detection unit configured to detect, in a case where, when each of the blocks is set as a block of interest, the local tip portion of the block of interest in an area formed of the plurality of blocks adjacent to the block of interest, including the block of interest, becomes a local tip portion closest from the image-capturing position in the region, the local tip portion as a projecting portion, and
a tracking unit configured to continuously track the position of the projecting portion detected by the projecting portion detection unit,
the image processing method comprising:
obtaining, in the depth image obtaining unit, a depth image including information on distances from an image-capturing position to a subject in a two-dimensional image to be captured, the depth image being in units of pixels of the image;

detecting, in the local tip portion detection unit, a portion of the subject at a depth and a position close from the image-capturing position as a local tip portion in units of blocks formed every plurality of adjacent pixels in the depth image;

detecting, in the projecting portion detection unit, in a case where, when each of the blocks is set as a block of interest, the local tip portion of the block of interest in an area formed from the plurality of blocks adjacent to the block of interest, including the block of interest, becomes a local tip portion closest from the image-capturing position in the area, the local tip portion as a projecting portion; and tracking, in the projecting portion detection unit, the position of the projecting portion detected in the projecting portion detection.

7. The image processing method according to claim 6, further comprising recognizing, by a gesture detection unit further included in the image processing apparatus, a trajectory of the position of the projecting portion tracked by the tracking unit as an action of the subject to be image-captured in the image, and detecting a gesture made by the action of the subject on the basis of the trajectory.

8. The image processing method according to claim 7, wherein the position of the projecting portion that is detected by the projecting portion detection unit is started to be tracked by the tracking unit, and thereafter, when the projecting portion is continuously detected in the time direction within a predetermined range in the vicinity of the position of the projecting portion detected immediately before, the position of the projecting portion that is continuously detected in the time direction within the predetermined range in the vicinity of the position of the projecting portion detected immediately before is tracked, and, when the projecting portion is not continuously detected in the time direction within the predetermined range in the vicinity of the position of the projecting portion detected immediately before, the position of the local tip portion that is continuously detected in the time direction in the predetermined range in the vicinity of the position of the projecting portion detected immediately before as the position of the projecting portion is tracked.

9. The image processing method according to claim 8, wherein either the position of the projecting portion tracked by the tracking unit or the position of the local tip portion as the position of the tip portion is tracked by the tracking unit, a likelihood in each of the tip portions is set by the tracking unit, and the tracking of the tip portion in which the likelihood has become smaller than a predetermined threshold value is ended by the tracking unit.

10. The image processing method according to claim 9, further comprising setting, by a tracking priority setting unit further included in the image processing apparatus, a tracking priority of the tip portion in accordance with a gesture detected by the gesture detection unit on the basis of the trajectory of the tip portion,
wherein the respective likelihoods is set by the tracking unit on the basis of the corresponding tracking priorities of the respective tip portions.

11. A non-transitory computer-readable medium having embodied thereon a computer application program, which when executed by a computer, causes the computer that controls an image processing apparatus including
a depth image obtaining unit configured to obtain a depth image including information on distances from an image-capturing position to a subject in a two-dimensional image to be captured, the depth image being in units of pixels of the image, a local tip portion detection unit configured to detect a portion of the subject at a depth and a position close from the image-capturing position as a local tip portion in units of blocks formed every plurality of adjacent pixels in the depth image, a projecting portion detection unit configured to detect, in a case where, when each of the blocks is set as a block of interest, the local tip portion of the block of interest in an area formed of the plurality of blocks adjacent to the block of interest, including the block of interest, becomes a local tip portion closest from the image-capturing position in the region, the local tip portion as a projecting portion, and a tracking unit configured to continuously track the position of the projecting portion detected by the projecting portion detection unit to perform processing comprising:

obtaining, in the depth image obtaining unit, a depth image including information on distances from an image-capturing position to a subject in a two-dimensional image to be captured, the depth image being in units of pixels of the image;

detecting, in the local tip portion detection unit, a portion of the subject at a depth and a position close from the image-capturing position as a local tip portion in units of blocks formed every plurality of adjacent pixels in the depth image;

detecting, in the projecting portion detection unit, in a case where, when each of the blocks is set as a block of interest, the local tip portion of the block of interest in an area formed from the plurality of blocks adjacent to the block of interest, including the block of interest, becomes a local tip portion closest from the image-capturing position in the area, the local tip portion as a projecting portion; and continuously tracking, in the projecting portion detection unit, the position of the projecting portion detected in the projecting portion detection.

12. The computer-readable medium according to claim 11, wherein the processing further comprises recognizing, by a gesture detection unit further included in the image processing apparatus, a trajectory of the position of the projecting portion tracked by the tracking unit as an action of the subject to be image-captured in the image, and detecting a gesture made by the action of the subject on the basis of the trajectory.

13. The computer-readable medium according to claim 12, wherein the position of the projecting portion that is detected by the projecting portion detection unit is started to be tracked by the tracking unit, and thereafter, when the projecting portion is continuously detected in the time direction within a predetermined range in the vicinity of the position of the projecting portion detected immediately before, the position of the projecting portion that is continuously detected in the time direction within the predetermined range in the vicinity of the position of the projecting portion detected immediately before is tracked, and, when the projecting portion is not continuously detected in the time direction within the predetermined range in the vicinity of the position of the projecting portion detected immediately before, the position of the local tip portion that is continuously detected in the time direction in the predetermined range in the vicinity of the position of the projecting portion detected immediately before as the position of the projecting portion is tracked.

14. The computer-readable medium according to claim 13, wherein either the position of the projecting portion tracked by the tracking unit or the position of the local tip portion as the position of the tip portion is tracked by the tracking unit, a likelihood in each of the tip portions is set by the tracking unit, and the tracking of the tip portion in which the likelihood has become smaller than a predetermined threshold value is ended by the tracking unit.

15. The computer-readable medium according to claim 14, wherein the processing further comprises setting, by a tracking priority setting unit further included in the image processing apparatus, a tracking priority of the tip portion in accordance with a gesture detected by the gesture detection unit on the basis of the trajectory of the tip portion,
   wherein the respective likelihoods is set by the tracking unit on the basis of the corresponding tracking priorities of the respective tip portions.

* * * * *